United States Patent
Kallas et al.

(10) Patent No.: US 10,865,937 B2
(45) Date of Patent: Dec. 15, 2020

(54) ADJUSTABLE JOINT FOR MICROPHONE

(71) Applicant: ACCESS PRODUCTS GROUP, LLC, Kingston, WA (US)

(72) Inventors: Ryan Kallas, Bainbridge Island, WA (US); J. Herschel Blankenship, Poulsbo, NE (US)

(73) Assignee: MUSIC EXPRESS, LLC, Kingston, WA (US)

( * ) Notice: Subject to any disclaimer, the term of this patent is extended or adjusted under 35 U.S.C. 154(b) by 691 days.

(21) Appl. No.: 15/083,351

(22) Filed: Mar. 29, 2016

(65) Prior Publication Data

US 2016/0223128 A1 Aug. 4, 2016

Related U.S. Application Data

(62) Division of application No. 14/347,030, filed as application No. PCT/US2012/000415 on Sep. 26, 2012, now Pat. No. 9,297,409.

(Continued)

(51) Int. Cl.
| | |
|---|---|
| *F16M 11/14* | (2006.01) |
| *F16M 11/20* | (2006.01) |
| *H04R 1/08* | (2006.01) |
| *F16C 11/06* | (2006.01) |
| *F16M 11/04* | (2006.01) |

(Continued)

(52) U.S. Cl.
CPC ..... *F16M 11/2078* (2013.01); *F16C 11/0623* (2013.01); *F16M 11/041* (2013.01); *H04R 1/08* (2013.01); *H04R 1/083* (2013.01); *H04R 1/326* (2013.01); *H04R 1/406* (2013.01); *Y10T 403/32311* (2015.01)

(58) Field of Classification Search
CPC ........... Y10T 403/32; Y10T 403/32254; Y10T 403/32262; Y10T 403/32311; Y10T 403/32672; Y10T 403/32647; Y10T 403/32573; Y10T 403/32565; Y10T 403/32032; F16C 11/0623; F16C 11/0647; F16C 11/106; H04R 1/083; H04R 1/406; H04R 1/08; H04R 1/326; F16M 11/00; F16M 11/06; F16M 11/08; F16M 13/00; F16M 2200/00; F16M 11/14; F16M 2200/021; F16M 2200/022
USPC ... 403/54, 55, 56, 76, 84, 90, 112, 114, 362, 403/373; 248/181.2, 288.51, 481; 269/58, 71, 75, 76, 80, 83
See application file for complete search history.

(56) References Cited

U.S. PATENT DOCUMENTS 1,045,583 A * 11/1912 Mills .................. G10G 5/00
 211/85.6
1,474,854 A 11/1923 Spire
(Continued)

FOREIGN PATENT DOCUMENTS

DE 1239355 B * 4/1967 ............. H04R 1/406
DE 102007023720 A1 * 11/2008 ........... H04R 29/001
(Continued)

OTHER PUBLICATIONS

PCTUS2012/000415 Preliminary Search Report; dated Apr. 10, 2014; 5 pages.

*Primary Examiner* — Michael P Ferguson
(74) *Attorney, Agent, or Firm* — J. Bennett Mullinax, LLC

(57) ABSTRACT

A microphone stand is provided that includes a dual mic frame that carries a first microphone and a second microphone.

4 Claims, 35 Drawing Sheets

US 10,865,937 B2
Page 2

Related U.S. Application Data

(60) Provisional application No. 61/626,401, filed on Sep. 26, 2011.

(51) Int. Cl.
*H04R 1/32* (2006.01)
*H04R 1/40* (2006.01)

(56) References Cited

U.S. PATENT DOCUMENTS

| | | | | |
|---|---|---|---|---|
| 1,579,907 A * | | 4/1926 | Zink | B60R 1/04 248/481 |
| 1,688,148 A | | 10/1928 | Martim | |
| 1,780,383 A | | 11/1930 | Green | |
| 2,089,439 A * | | 8/1937 | Silberstein | F16M 11/14 248/181.1 |
| 2,122,778 A | | 7/1938 | Mueller | |
| 2,298,176 A | | 10/1942 | Rodney | |
| 2,332,504 A * | | 10/1943 | Wilhelm | F16M 11/14 248/181.1 |
| 2,362,100 A | | 11/1944 | Rodney | |
| 2,421,437 A | | 6/1947 | Ryan | |
| 2,434,440 A | | 1/1948 | Julius | |
| 2,672,313 A | | 3/1954 | Poole | |
| 2,752,116 A | | 6/1956 | Minnis | |
| 2,776,462 A * | | 1/1957 | Burroughs | H04R 1/08 248/122.1 |
| 3,128,982 A | | 4/1964 | Christopher | |
| 3,278,207 A | | 10/1966 | Barish | |
| 3,324,254 A * | | 6/1967 | Shaw | H04R 1/08 248/121 |
| 3,341,230 A | | 9/1967 | Wochers | |
| 3,562,446 A | | 2/1971 | Wolf | |
| 3,632,073 A | | 1/1972 | Nakatani | |
| D227,742 S | | 7/1973 | Logdson | |
| 3,781,093 A * | | 12/1973 | Grabijas | F16M 11/14 248/481 |
| 3,783,547 A | | 1/1974 | Bystorm et al. | |
| 4,004,850 A * | | 1/1977 | Nelson | A01M 31/00 359/855 |
| 4,206,324 A * | | 6/1980 | Horikawa | H04R 1/08 381/26 |
| 4,226,550 A | | 10/1980 | Kupcak | |
| 4,447,139 A * | | 5/1984 | Biber | F16C 11/106 359/377 |
| 4,492,488 A | | 1/1985 | Warshawsky | |
| 4,579,009 A * | | 4/1986 | Carmichael | B01L 3/021 285/298 |
| D291,650 S | | 9/1987 | Monzen | |
| 4,708,510 A | | 11/1987 | McConnell et al. | |
| 4,787,613 A | | 11/1988 | Hayes | |
| D305,026 S * | | 12/1989 | Wolf | F16C 11/103 D14/229 |
| 5,118,058 A * | | 6/1992 | Richter | F16C 11/103 248/183.2 |
| 5,224,692 A | | 7/1993 | Anderson et al. | |
| 5,419,522 A | | 5/1995 | Luecke et al. | |
| 5,490,599 A * | | 2/1996 | Tohidi | H04R 1/406 211/171 |
| 5,505,415 A | | 4/1996 | Brett | |
| 5,775,654 A | | 7/1998 | Price | |
| 5,806,821 A * | | 9/1998 | Phillips | F16C 11/106 248/288.51 |
| 5,839,712 A | | 11/1998 | Wang | |
| 5,897,417 A * | | 4/1999 | Grey | A63H 33/062 446/125 |
| 5,957,445 A | | 9/1999 | Hagman et al. | |
| 6,164,843 A | | 12/2000 | Battocchio | |
| 6,219,429 B1 * | | 4/2001 | Chung | H04R 1/08 248/324 |
| 6,254,044 B1 | | 7/2001 | Lee | |
| D447,472 S * | | 9/2001 | McGugan | H04R 1/08 D14/225 |
| 6,316,706 B1 * | | 11/2001 | Sammons | A47B 19/002 84/327 |
| 6,352,228 B1 | | 3/2002 | Buerklin | |
| D464,944 S | | 10/2002 | Lee et al. | |
| 6,532,711 B2 | | 3/2003 | Gregel | |
| 6,560,346 B2 | | 5/2003 | Ohta | |
| 6,570,992 B1 | | 5/2003 | Folan | |
| 6,578,805 B2 * | | 6/2003 | Uchimura | F16M 11/10 248/309.1 |
| 6,581,892 B2 * | | 6/2003 | Carnevali | F16C 11/0604 248/181.1 |
| 6,625,293 B1 * | | 9/2003 | Nageno | H04R 1/08 181/20 |
| 6,671,382 B2 | | 12/2003 | Chen | |
| 6,722,842 B1 * | | 4/2004 | Sawdon | B23K 37/0452 414/729 |
| D490,399 S * | | 5/2004 | Kamo | H04R 1/08 D14/206 |
| D497,156 S | | 10/2004 | Bauman | |
| 6,842,528 B2 | | 1/2005 | Kuerti | |
| D507,591 S | | 7/2005 | Kamijima et al. | |
| 6,922,475 B2 | | 7/2005 | Hsieh | |
| 7,007,901 B2 | | 3/2006 | Kondo | |
| 7,100,881 B2 | | 9/2006 | Worrall | |
| D548,729 S * | | 8/2007 | Miller | D14/226 |
| 7,300,028 B2 | | 11/2007 | Vogt | |
| 7,341,017 B2 * | | 3/2008 | Jackson | B63B 17/00 114/343 |
| D579,928 S | | 11/2008 | Murata | |
| 7,461,995 B2 * | | 12/2008 | Burnley | B63B 17/02 403/122 |
| 7,708,736 B2 * | | 5/2010 | Mullaney | A61B 17/645 403/385 |
| D617,781 S * | | 6/2010 | Kallas | D14/226 |
| D618,222 S | | 6/2010 | Kallas et al. | |
| 7,753,330 B2 * | | 7/2010 | Brief | B60R 11/0241 248/278.1 |
| 7,959,120 B2 * | | 6/2011 | Liao | B60R 11/0252 248/122.1 |
| 7,993,069 B2 | | 8/2011 | Persson | |
| 8,021,060 B2 | | 9/2011 | Sudhana | |
| 8,894,316 B2 * | | 11/2014 | Kallas | F16M 11/14 403/90 |
| 9,297,409 B2 | | 3/2016 | Kallas | |
| 2002/0104945 A1 * | | 8/2002 | Uchimura | F16M 11/10 248/316.1 |
| 2005/0001116 A1 | | 1/2005 | Vogt | |
| 2006/0175482 A1 | | 8/2006 | Johnson | |
| 2008/0023607 A1 * | | 1/2008 | Barker | F16M 11/08 248/288.51 |
| 2011/0022055 A1 | | 1/2011 | Kallas et al. | |
| 2011/0147548 A1 * | | 6/2011 | Kang | F16M 11/14 248/181.2 |
| 2011/0188925 A1 * | | 8/2011 | Komine | F16C 11/106 403/83 |

FOREIGN PATENT DOCUMENTS

| | | | | |
|---|---|---|---|---|
| JP | 9-126392 | * | 5/1997 | F16M 11/04 |
| WO | WO 2010/027056 | * | 3/2010 | F16M 11/14 |

* cited by examiner

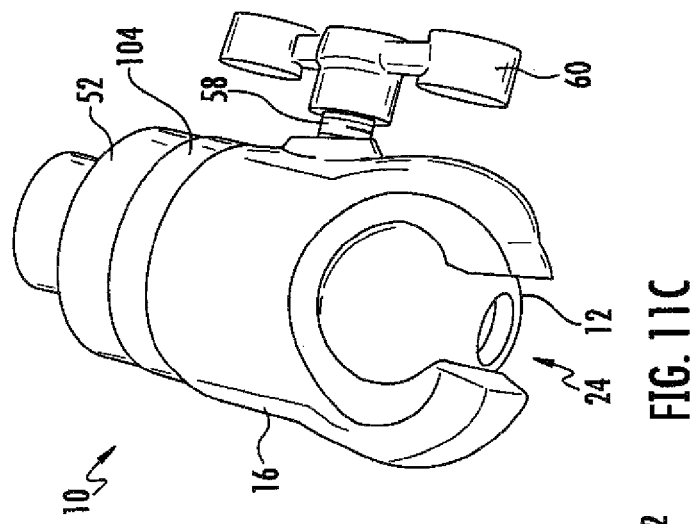
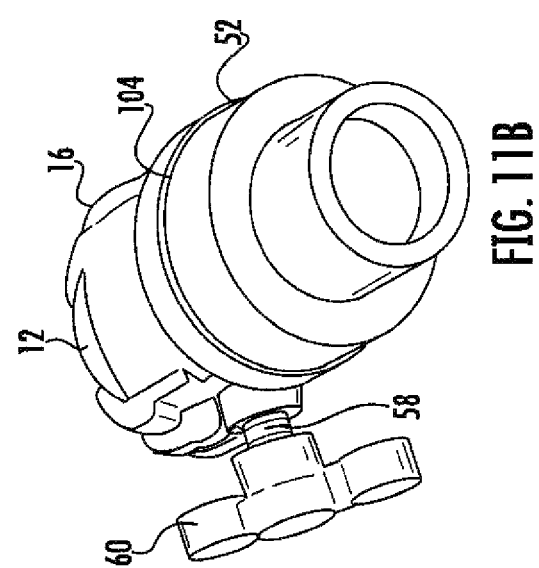
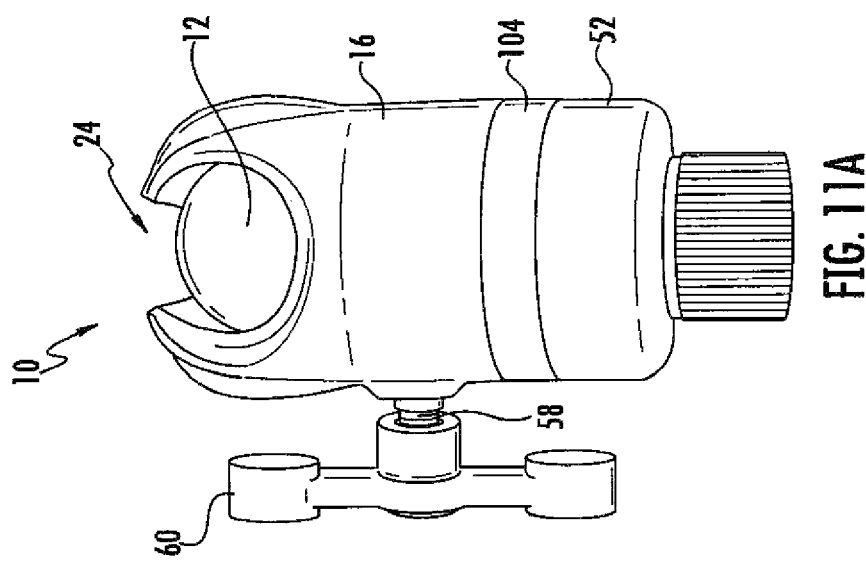

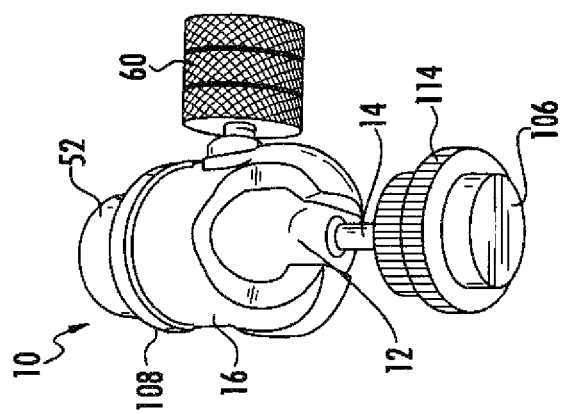
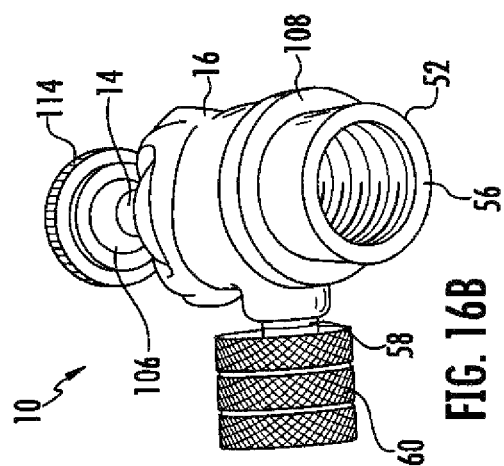
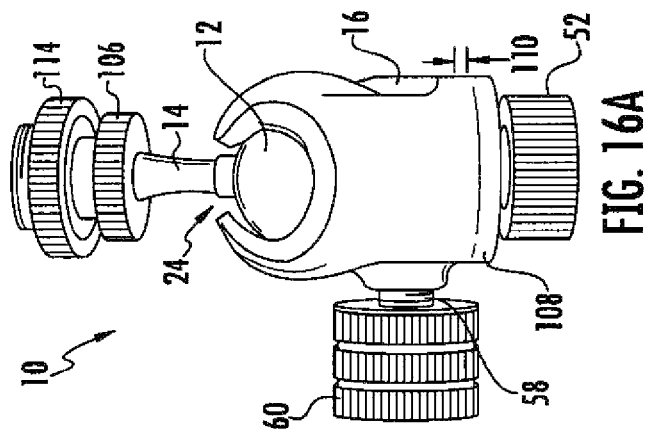

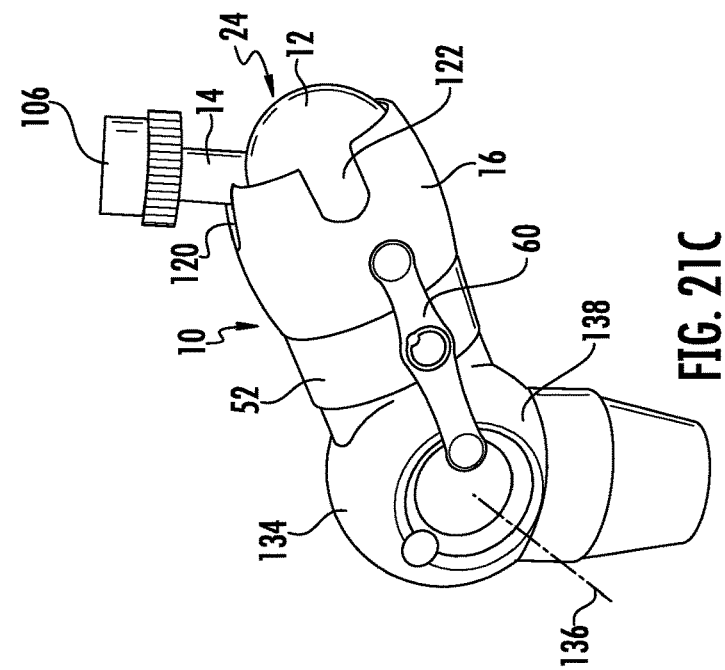
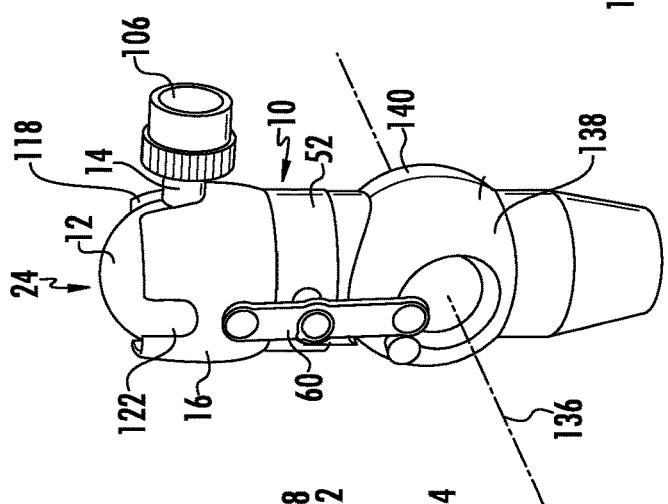
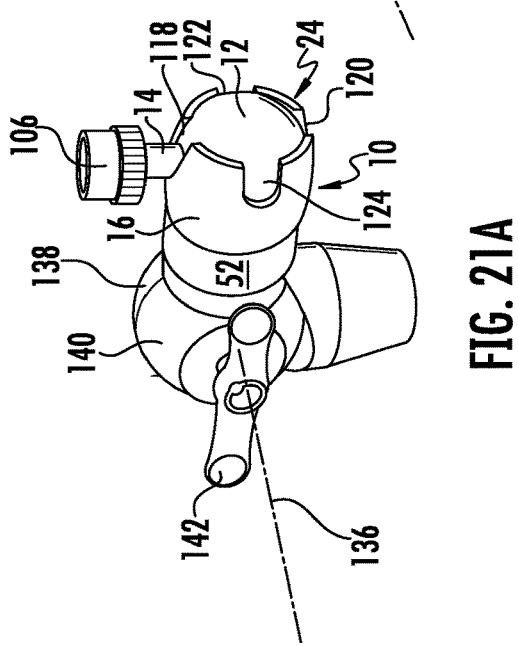
FIG. 21C
FIG. 21B
FIG. 21A

ADJUSTABLE JOINT FOR MICROPHONE

CROSS REFERENCE TO RELATED APPLICATION

This application is a divisional of application Ser. No. 14/347,030 filed on Mar. 25, 2017 now U.S. Pat. No. 9,297,409 which is a 371 of PCT/USC12/00415 filed on 0/26/2012 which claims the benefit of U.S. Application Ser. No. 61/626,401 filed Sep. 26, 2011.

FIELD OF THE INVENTION

The present invention relates generally to an adjustable joint for use with a microphone. More particularly, the present application involves an adjustable joint for a microphone that allows for constrained swiveling adjustment of an attached microphone or portion of a microphone stand or boom to which the microphone is attached.

BACKGROUND

Microphones are used by performers and speakers during performances and may be either held in the hand of the user or placed onto a stand during use. The use of a microphone stand allows the microphone to be located and fixed at a desired position thus allowing actors, musical performers, or other users free use of their hands and a consistent, known placement of the microphone. During certain performances, a user may desire that the position of the microphone be adjusted. In such instances, the stand to which the microphone is mounted may feature an adjustable joint that includes a wing nut that can be loosened in order to cause two plates that were interlocked through complimentary teeth and urged against one another to be separated. The user may adjust the microphone or the portion of the microphone stand holding the microphone about a pivot axis that extends in a horizontal direction. Once the microphone is oriented to the desired position, the user may tighten the wing nut thus causing the two plates to be urged against one another and subsequently relocked through interlocking of the complimentary teeth of the two plates. Although such adjustment mechanisms are capable of adjusting a microphone during use, they are limited in their range of adjustment and thus limited in applicability. Further, microphone stands are not capable of holding or positioning more than a single microphone and thus may be limited in certain applications. As such there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification which makes reference to the appended Figs. in which:

FIG. 11A is a front view of an adjustable joint in accordance with one exemplary embodiment.

FIG. 11B is a bottom perspective view of the adjustable joint of FIG. 11A.

FIG. 11C is a top perspective view of the adjustable joint of FIG. 11A.

FIG. 16A is a font view of an adjustable joint in accordance with one exemplary embodiment.

FIG. 16B is a bottom perspective view of the adjustable joint of FIG. 16A.

FIG. 16C is a top perspective view of the adjustable joint of FIG. 16A.

FIGS. 21A-21C are perspective views of a microphone stand that includes a pivoting joint and an adjustable joint in various configurations of adjustment.

Figure 1:
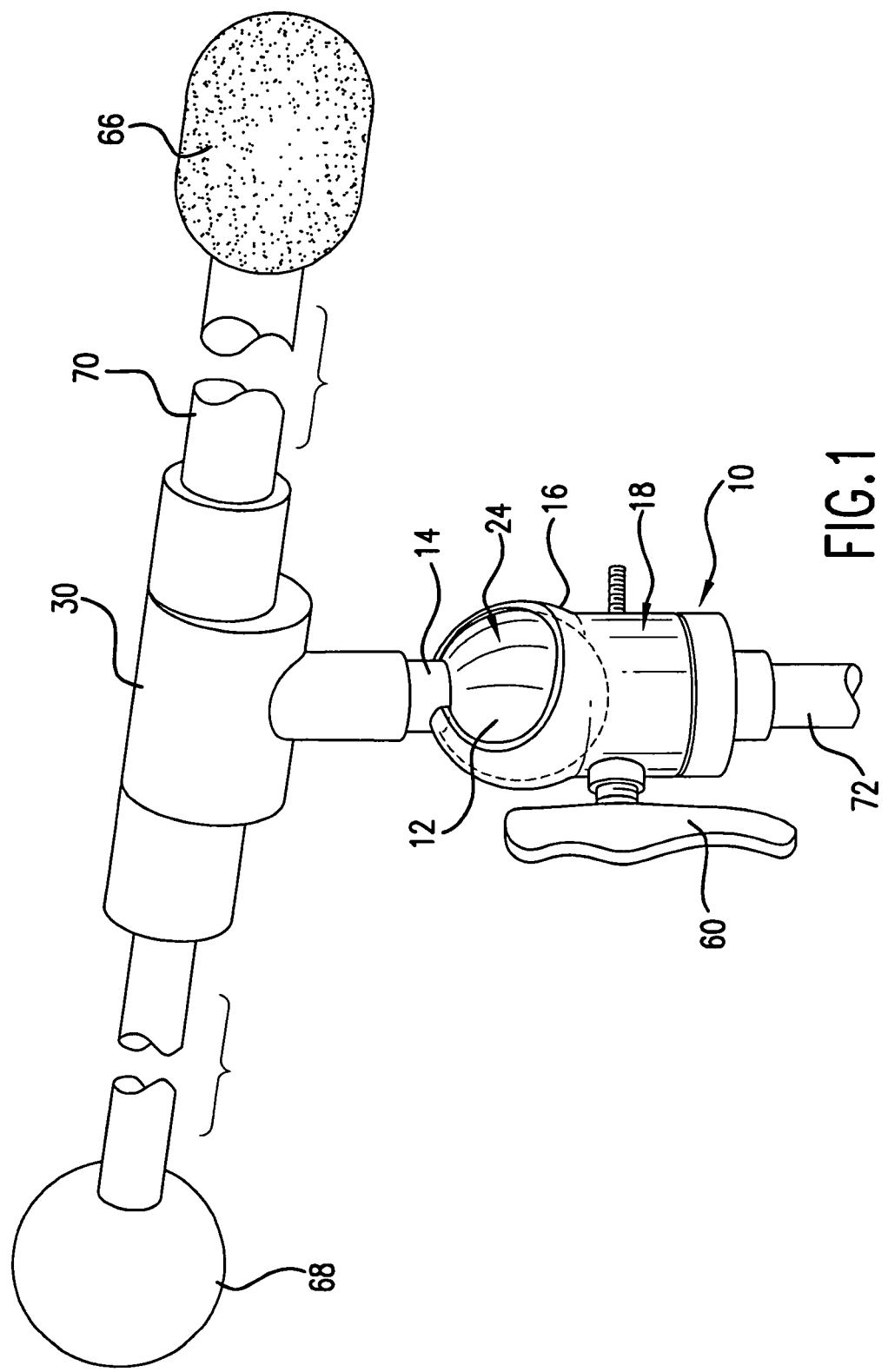
FIG. 1 is a perspective view of a microphone stand that employs an adjustable joint, in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance a limit of up to 7 also includes a limit of up to 5, up to 3, and up to 4.5.

The present invention provides for an adjustable joint 10 used in connection with a microphone 66 that allows adjustment in certain orientations and prevents adjustment in other orientations. A performer using the microphone 66 during a performance may desire the microphone 66 be moved along a single arc. In such instances, the orientation of the microphone 66 in some directions other than in the direction of the single arc may be limited. However, the microphone 66 may be afforded a greater range of movement when adjusted into positions outside of a portion of the single arc. The adjustable joint 10 thus restricts certain ranges of movement of the microphone 66.

FIG. 1 illustrates an exemplary embodiment of the adjustable joint 10 used in connection with a microphone 66 that is affixed to the end of a boom 70. A boom clutch 30 is attached to one, end of the boom 70, and a counterweight 68 is attached to the opposite end of the boom clutch 30. A column 72 provides vertical height for the assembly, and the adjustable joint 10 is attached to the top of the column 72. The boom clutch 30 is attached to the end of the adjustable joint 10 opposite from the attachment position of the column 72. The orientation of the boom clutch 30, counterweight 68, boom 70, and microphone 66 can be adjusted with respect to the column 72 upon actuating the adjustable joint 10. Once positioned into a desired orientation, the position of the boom clutch 30, counterweight 68, boom 70, and microphone 66 can be fixed upon locking of the adjustable joint 10 by the user.

FIGS. 2-5 illustrate an adjustable joint 10 in accordance with one exemplary embodiment that includes a ball and socket connection that is used to afford repositioning of the microphone 66. A ball housing 16 is present that houses a ball 12. A stem 14 extends from the ball 12 and has a male slot joint 34 located at its upper end. The boom clutch 30 may feature a complimentary female joint that receives the male slot joint 34 of the stem 14 so as to effect attachment of the boom clutch 30 to the adjustable joint 10. However, it is to be understood that a variety of attachment mechanisms may be used to attach the adjustable joint 10 to the boom clutch 30, microphone 66, or other component. In yet other embodiments, the boom clutch 30, microphone 66, or other component may be integrally formed with the stem 14.

The ball 12 and the inner surface of the ball housing 16 can be complimentary in shape so that the ball 12 can rotate freely within the ball housing 16. The material of the ball 12 can be selected so as to give the outer surface of the ball 12 a rough matt finish. Further, the inner surface of the ball housing 16 may be variously configured to provide desired friction against the ball 12 so that an ease of movement between the ball 12 and the ball housing 16 may be realized. The inner surface of the ball housing 16 may be unpainted in certain embodiments to prevent paint from rubbing off onto the surface of the ball 12 during use.

Figure 2:
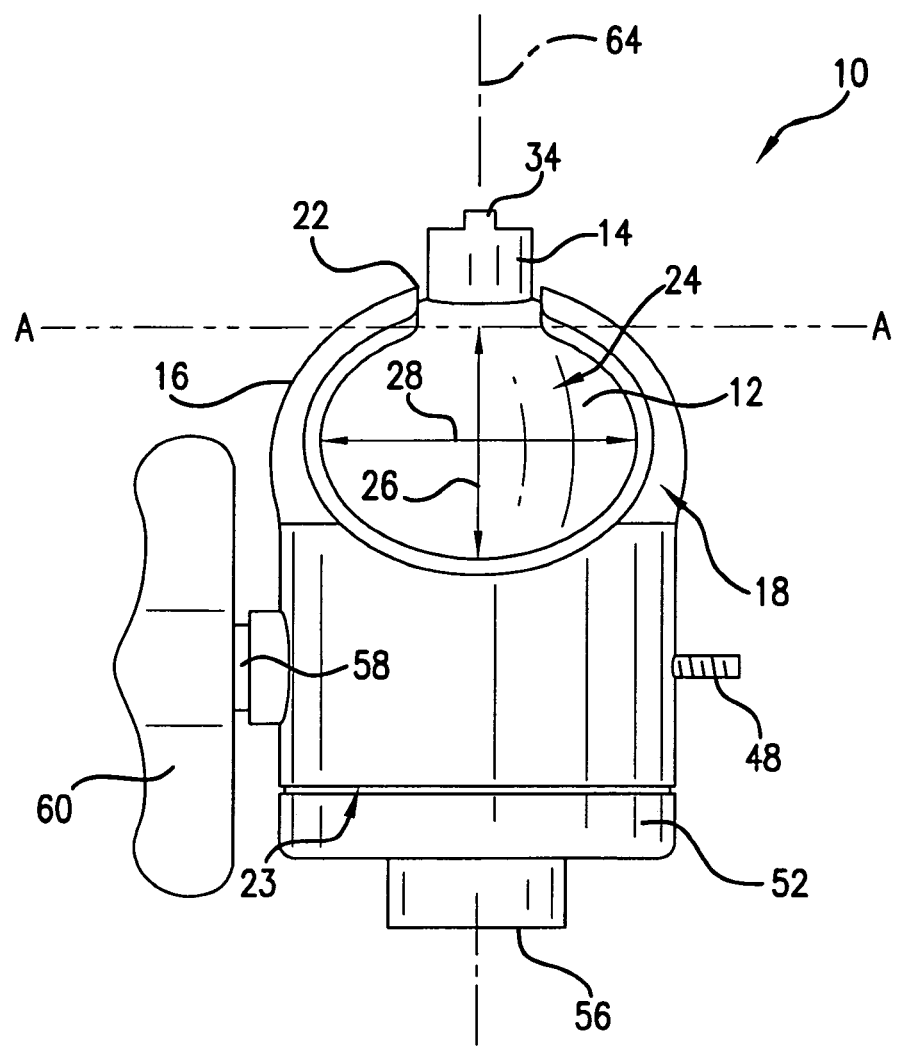
FIG. 2 is a front view of an adjustable joint in accordance with one exemplary embodiment.

The ball housing 16 has a front side 18 denoted generally as the portion of the outer surface of the ball housing 16 below line A-A in FIG. 2. The ball housing 16 has an end 22 that is the portion of the outer surface of the ball housing 16 above line A-A. A slot 24 is defined in the ball housing 16. The slot 24 is located on a portion of the front side 18 and has a length 26 that extends into the end 22. The length 26 of the slot 24 extends completely across the end 22 to a back side 20 of the ball housing 16 and is present over a portion of the back side 20. The back side 20 of the ball housing 16 is denoted as the portion of the outer surface of the ball housing 16 below line A-A and opposite from the front side 18. As such, the length 26 of the slot 24 may extend from the front side 18, across the entire end 22, and onto the back side 20. The length 26 of the slot 24 may be both arc shaped and linear shaped in certain embodiments. In yet other arrangements, the length 26 can be completely arc shaped and may have the same radius or may have different radii at certain locations.

Figure 3:
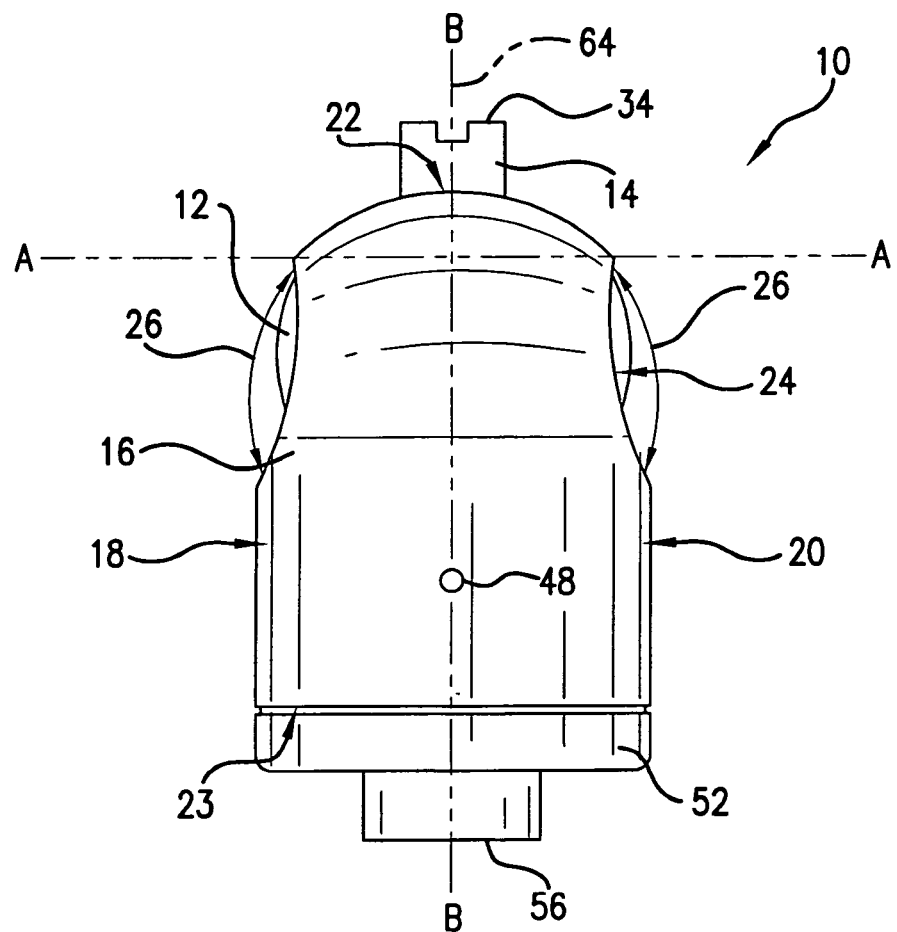
FIG. 3 is a side view of the adjustable joint of FIG. 2.
Figure 4:
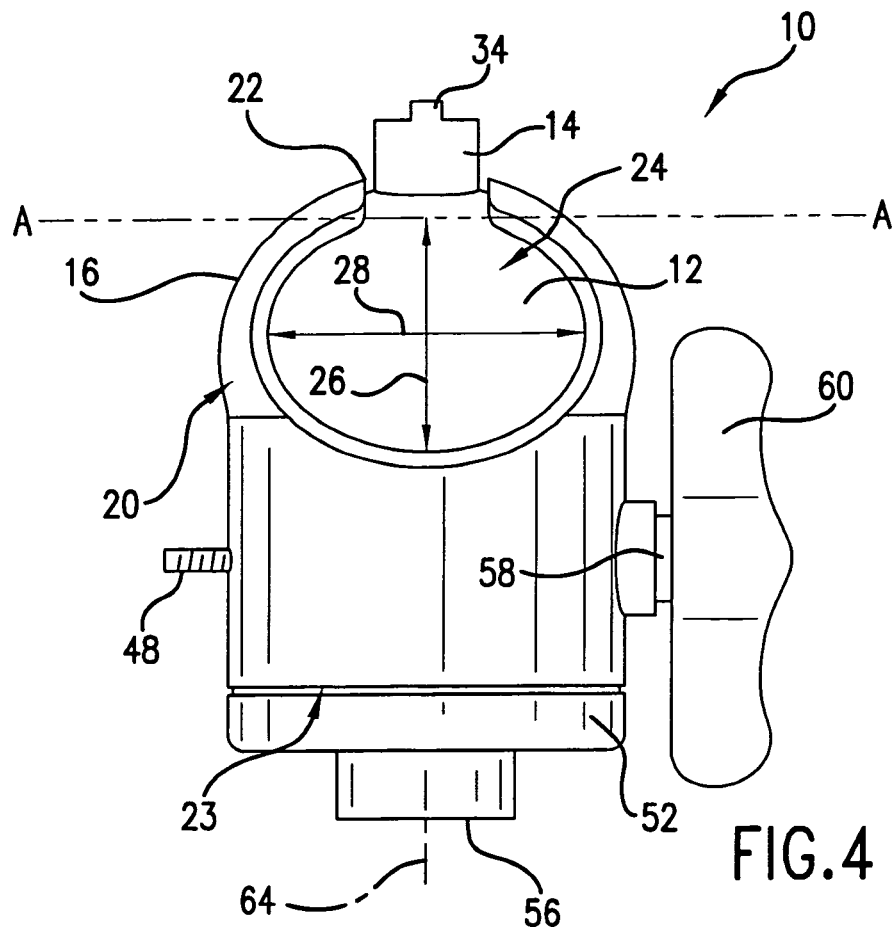
FIG. 4 is a back view of the adjustable joint of FIG. 2.
Figure 5:
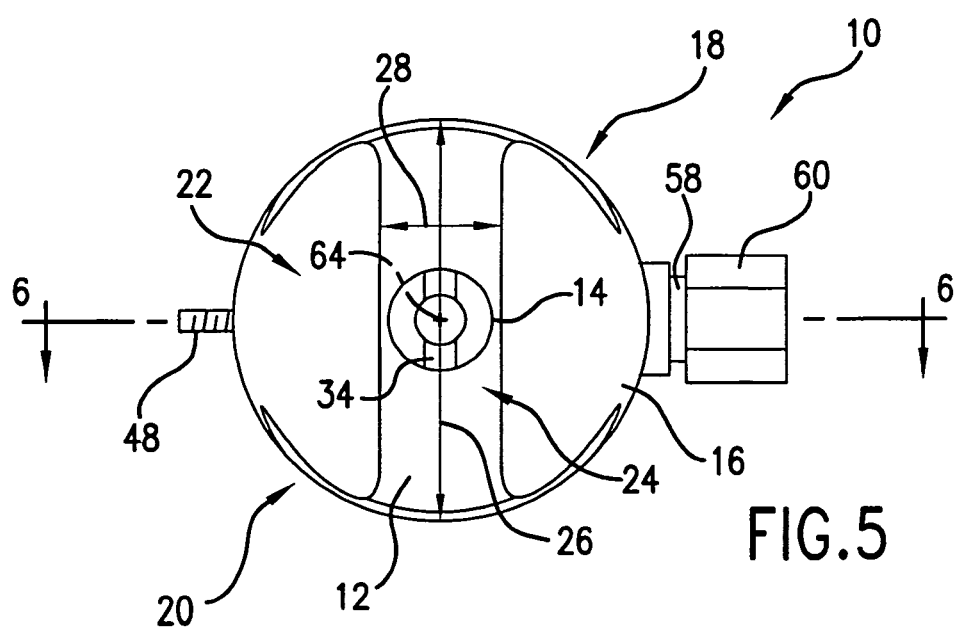
FIG. 5 is a top view of the adjustable joint of FIG. 2.

The width 28 of the slot 24 may be varied along the length 26 of the slot 24. As shown in FIG. 2, the slot 24 has a generally oval shape at the front side 18. The width 28 of the slot 24 increases and then decreases along the length 26 at the front side 18. With reference to FIG. 5, the width 28 of the slot 24 is constant along the length 26 at the end 22. However, it is to be understood that the width 28 need not be constant in accordance with other exemplary embodiments along the entire length 26 of the slot 24 at the end 22. FIG. 4 shows the slot 24 having a generally oval shape at the back side 20. Here, the width 28 increases and then decreases along the length 26 at the back side 20. The shape and size of the slot 24 at the front side 18 is the same as the shape and size of the slot 24 at the back side 20. However, it is to be understood that the shape and/or size of the slot 24 at the front side 18 may be different than the shape and/or size of the slot 24 at the back side 20 in other embodiments. The width 28 of the slot 24 at the end 22 is less than the maximum width 28 of the slot 24 at the front side 18 and is less than the maximum width of the slot 24 at the back side 20. In the exemplary embodiment shown, the slot 24 is symmetrical in shape. However, it is to be understood that other arrangements are possible in which the slot 24 is asymmetrical. The front side 18 and the back side 20 can be identified as being on opposite sides of line B-B as shown in FIG. 3 that bisects the center of the ball housing 16. The front side 18 and back side 20 may also both be below the end 22 that is located above line A-A. The front side 18 and back side 20 may make up 360° of the outer surface of the ball housing 16 along portions of the ball housing 16 below the end 22.

The variations in width 28 along the length 26 of the slot 24 allow for different ranges of movement of the ball 12 to be realized depending upon the stem's 14 location along the length 26. The stem 14 extends from the ball 12, and improvement of the ball 12 within the ball housing 16 will cause the stem 14 to be likewise moved due to their rigid attachment. The stem 14 may be moved against the ball housing 16 to thus limit the movement of the ball 12 with respect to the ball housing 16. In this manner, the range of movement of the microphone 66 can be controlled in a desired fashion. The range of movement of the ball 12 and stem 14 may be greatest at the front side 18 and back side 20 and can be the least at the end 22. However, it is to be understood that other arrangements are possible in which the maximum width 28 at the end 22 is greater than the maximum width 28 at the front side 18 and/or back side 20. As shown with reference to FIG. 7, a stem screw 32 may be used in order to effect attachment of the stem 14 to the ball 12. In other arrangements, the ball 12 and stem 14 may be integrally formed with one another. In yet other exemplary embodiments, various means may be used to attach the stem 14 to the ball 12.

Figure 8:
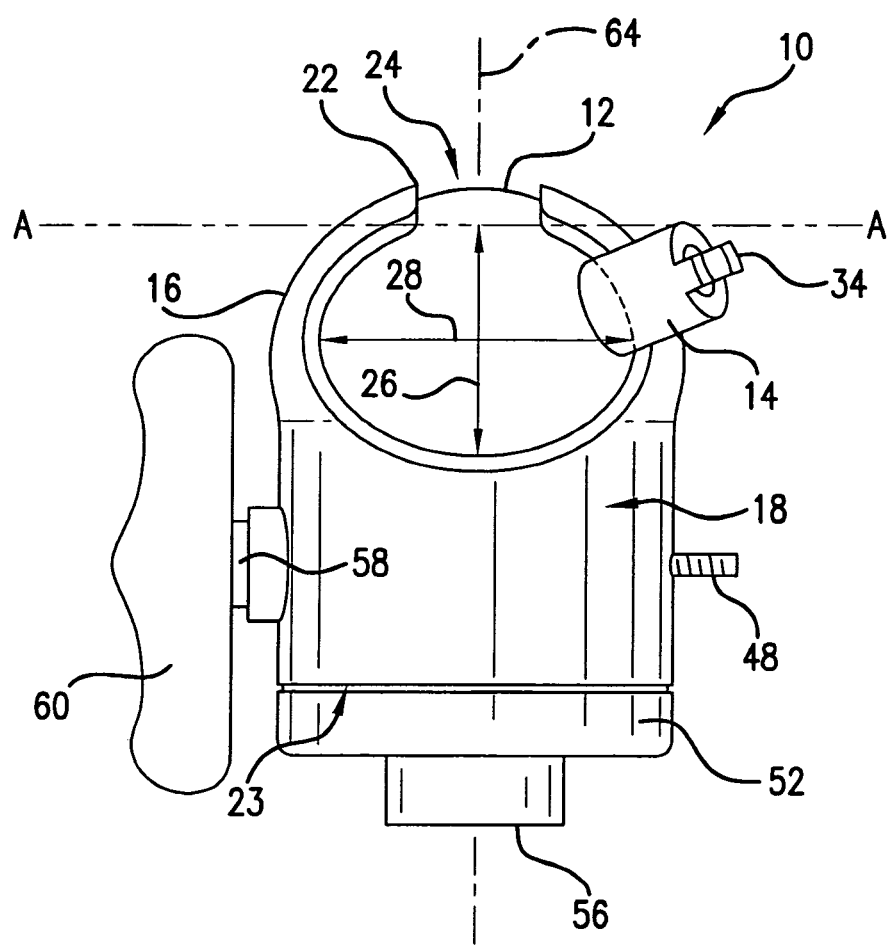
FIG. 8 is a front view of the adjustable joint of FIG. 1 in which a stem is positioned against the ball housing.

FIG. 8 shows the stem 14 located in the slot 24 at the front side 18 of the ball housing 16. The slot 24 is wider at the front side 18 than at the end 22 thus affording a greater range of motion of the stem 14 at portions of this location. The stem 14 contacts the edge of the ball housing 16 at the slot 24 and thus has its range of motion limited at this point.

Referring back to FIGS. 1-5, the end 22 of the ball housing 16 has an outer surface that is curved in shaped. The length 26 of the slot 24 at the end 22 follows the path of an arc and likewise is curved in shape. The stem 14 and components attached to the stem 14 are thus limited in movement along the arc length 26 of the slot 24 upon being moved through the slot 24 at the end 22. As such, the microphone 66 may be limited in movement along an arc when so adjusted during a performance. Placement of the stem 14 within the slot 24 at either the front side 18 or back side 20 of the ball housing 16 allows for the stem 14 and components attached to the stem 14 to be adjusted outside of the arc length 24 of the slot 24 at the end 22 because the slot 24 has a greater width 28 at locations at the front side 18 and back side 20. Although described as affording no movement in the width 28 direction at the end 22, it is to be understood that certain exemplary embodiments exist in which the stem 14 may move some amount in the width 28 direction due to the fact that the slot 24 at the end 22 is slightly wider than the stem 14. In this regard, the stem 14 can move some limited amount in the width 28 direction at the end 22 so that clearance is afforded between the stem 14 and the ball housing 16 at the end 22. In other arrangements, the stem 14 may be as wide as the slot 24 at the end 22 so that no movement in the width 28 direction is realized. In this regard, there will be an interference fit between the stem 14 and the ball housing 16 at the end 22 so that a user will have to exert some amount of force to move the stem 14 through the slot 24 at the end 22.

As discussed, the ball 12 is retained within the ball housing 16 and forms a ball and socket type connection that is limited in movement at certain degrees due to the particular shape of slot 24. The stem 14 that extends from ball 12 has a stem axis 64. The ball 12 is retained within the ball housing 16 in such a manner that the ball 12 may rotate completely 360° about the stem axis 64. As such, the ball 12, attached stem 14, and components attached to the stem 14 such as the microphone 66 may be free to rotate 360° about the stem axis 64. This rotational freedom may be present regardless of the location of the stem 14 in the slot 24. As such, the stem 14 may be free to rotate about the stem axis 64 when the stem 14 is in the slot 24 at the end 22 or is in the slot 24 at the front side 18 or back side 20 of the housing. Therefore, the ball 12, attached stem 14, and components attached to the stem 14 such as the microphone 66 can rotate 360° about the stem axis 64 when in the slot 24 at the end 22 even though movement is limited in the arc length 26 direction at the end 22 due to the shape of the slot 24 at the end 22. However, it is to be understood that other arrangements of the adjustable joint 10 are possible in which the ball 12, stem 14, and components attached to the stem 14 such as the microphone 66 are limited or even prevented from rotating about the stem axis 64.

The slot 24 may be formed in the ball housing 16 so that the edges of the ball housing 16 at the front side 18 and back side 20 are concave in shape along their entire lengths at the front side 18 and back side 20. Further, the slot 24 may be arranged so that the edges of the ball housing 16 at the end 22 are convex in shape along their entire lengths at the end 22. However, the edges of the ball housing 16 need not be arranged in these manners in other exemplary embodiments. For example, the edges of the ball housing 16 may be linear at certain locations, or may be concave at the end 22.

Figure 6:
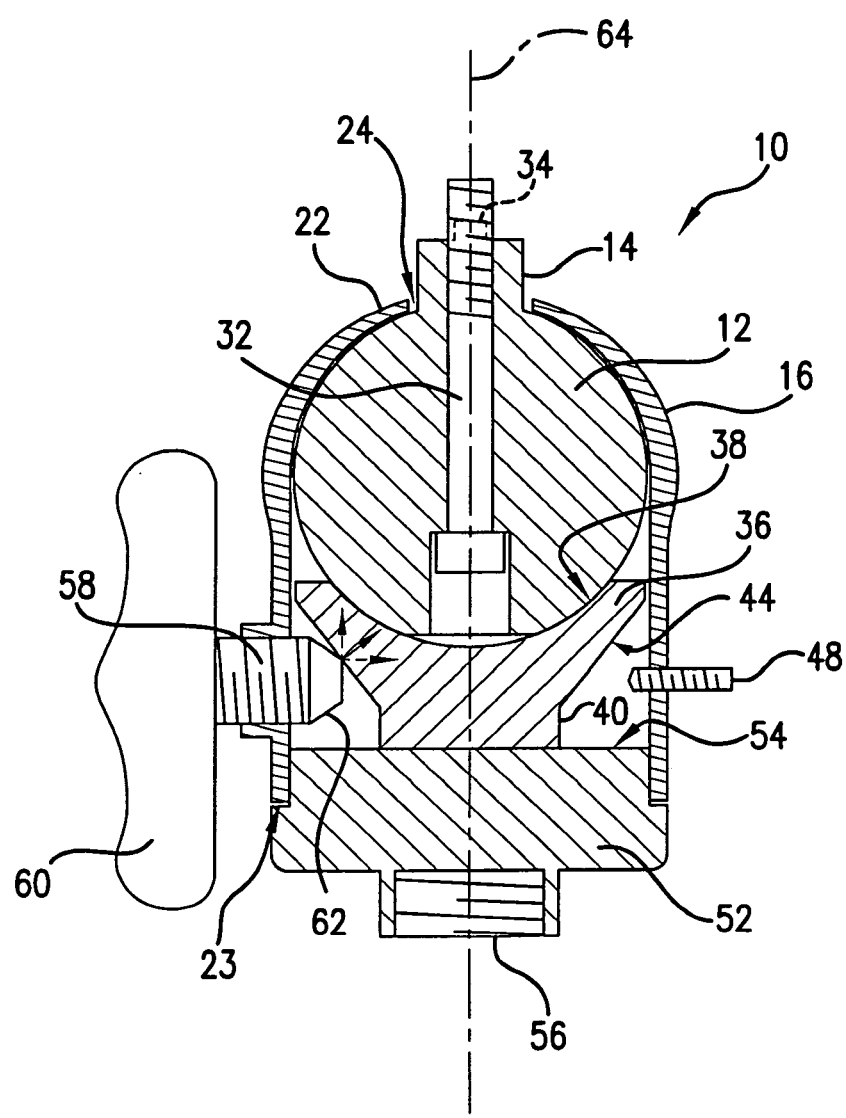
FIG. 6 is a cross-sectional view taken along line 6-6 of FIG. 5.
Figure 7:
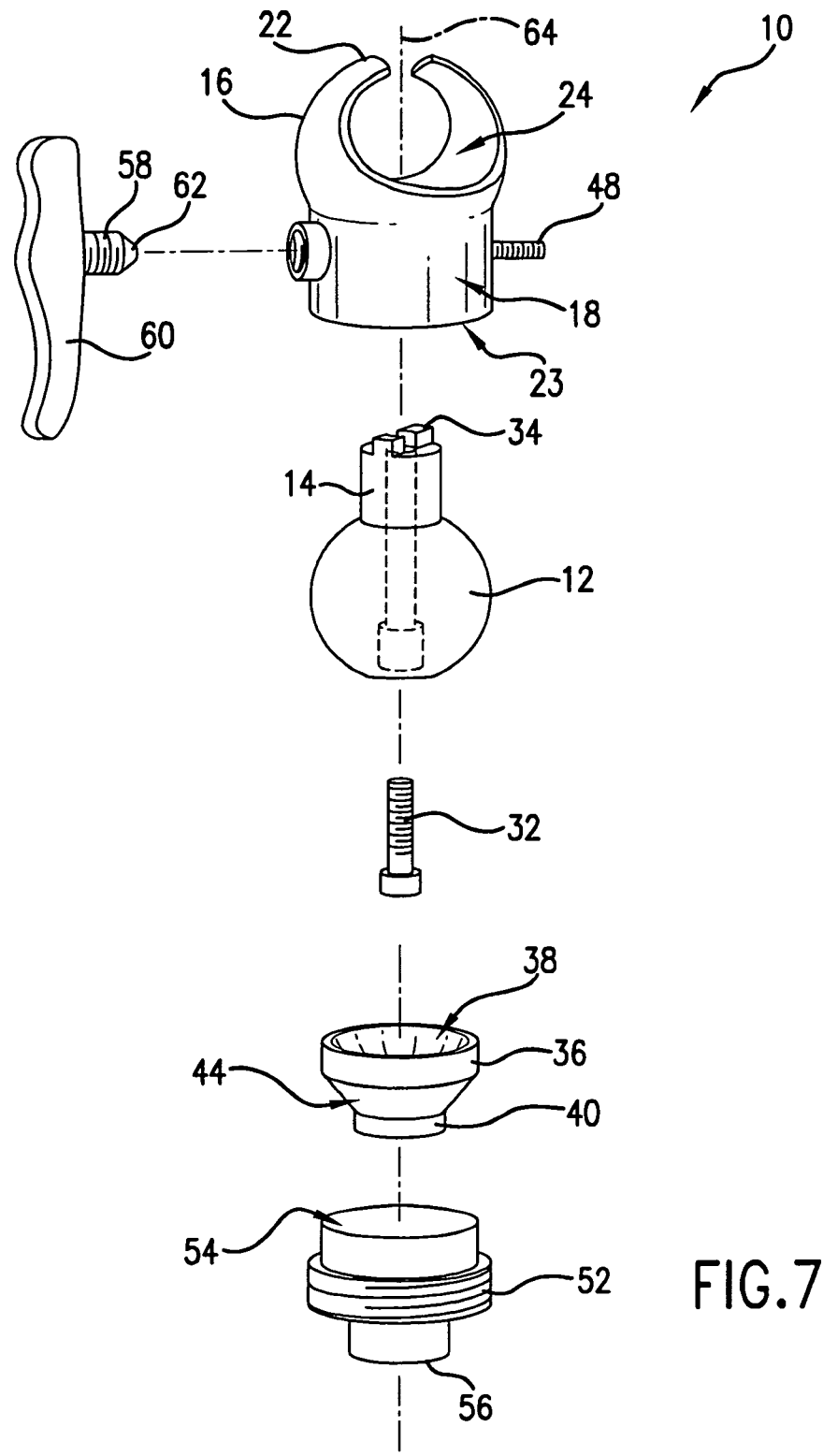
FIG. 7 is an exploded perspective view of the adjustable joint of FIG. 2.

A locking mechanism of the adjustable joint 10 is shown and described with reference to FIGS. 6 and 7. The bottom of the ball 12 may rest within a cup member 36 that is contained within the ball housing 16. The cup member 36 has a cup shaped upper section 38 that can be shaped so as to be complimentary in shape to the ball 12. In other arrangements the cup shaped upper section 38 may be shaped so as to form a ringed contact around a portion of the ball 12 so that the utmost lower portion of the ball 12 does not contact the cup shaped upper section 38. An inclined side wall 44 extends downward from the cup shaped upper section 38. A lower section 40 of the cup member 36 is located on the end of the cup member 36 opposite from the cup shaped upper section 38. A cap member 52 is rigidly attached to an end 23 of the ball housing 16 that is opposite the end 22. The attachment between the cap member 52 and the end 23 may be through a threaded connection in accordance with certain exemplary embodiments. In other arrangements, the cap member 52 may be press fit onto the end 23 or attached with mechanical fasteners. Rigid attachment of the cap member 52 to the ball housing 16 causes the cap member 52 to be fixed to the ball housing 16 so that their positions relative to one another do not change. Although described as being rigidly attached to the end 23, the cap member 52 need not rigidly attached in other arrangements.

The lower section 40 of the cup member 36 may rest onto an upper surface 54 of the cap member 52. The cap member 36 may also have a receiving portion 56 located on its lower end. The receiving portion 56 can receive and be attached to the upper end of the column 72. The receiving portion 56 can be arranged in a variety of manners so as to effect releasable attachment to the column 72 or other component of the microphone stand assembly such as the microphone 66 in certain arrangements. Further, other arrangements are possible in which the receiving portion 56 is permanently attached to the column 72 or other portion of the microphone stand assembly such that the adjustable joint 10 is non-removable therefrom.

A tightening screw 58 may be mounted to the ball housing 16 and can extend through a wall of the ball housing 16 and into its interior. A knob 60 is located at the end of the tightening screw 58 and can be attached thereto or integrally formed therewith. A portion of the ball housing 16 is internally threaded and engages external threading on the tightening screw 58 so that rotation by the user causes the tightening screw 58 to move further into and out of the interior of the ball housing 16. A plunger 62 that has a flat surface, and an angled surface extending from the flat surface, is located at the end of the tightening screw 58. The plunger 62 can be integrally formed with the tightening screw 58 or be a separate component that is attached thereto. Actuation of the knob 60 causes the plunger 62 to move further into and out of the interior of the ball housing 16.

The tightening screw 58 is arranged so that the plunger 62 is located adjacent the inclined side wall 44. Movement of the plunger 62 against the inclined side wall 44 functions to produce forces on the cup member 36 in both the horizontal (radial) and vertical (axial) directions due to the inclined arrangement of the inclined side wall 44. A set screw 48 may be located through the wall of the ball housing 16 on a side opposite the tightening screw 58 to prevent the inclined side wall 44 from moving in the horizontal (radial) direction at a certain point. Movement of the inclined side wall 44 in the vertical (axial) direction causes the lower section 40 of the cup member 36 to lift off of the upper surface 54. Due to the rigid attachment between the cup shaped upper section 38 and the inclined side wall 44, movement of the inclined side wall 44 in the vertical (axial) direction causes the cup shaped upper section 38 to likewise be moved in the vertical (axial) direction thus applying an upward force onto the ball 12 due to the engagement between the ball 12 and the cup shaped upper section 38. Forces applied to the bottom of the ball 12 likewise cause the ball 12 to be urged upwards onto the interior surface of the ball housing 16. The ball housing 16 is a rigid member and thus will not move in response to pressure applied onto it by the ball 12. Locking of the position of the ball 12 with respect to the ball housing 16 will thus result. This locking will likewise fix the position of the stem 14 and all attached components such as the boom clutch 30, counter weight 68, boom 70, and microphone 66. The position or the microphone 66 may thus be locked into a desired location.

When adjustment is desired, the user may rotate the knob 60 in the opposite direction so as to release pressure by the plunger 62 against the inclined side wall 44 which results in the removal of locking forces between the ball 12 and the interior of the ball housing 16. The ball 12 and stem 14 along with the attached components may then be adjusted to a new position as desired. It is to be understood that the locking mechanism shown is exemplary and that others are possible in accordance with other exemplary embodiments. For example, instead of an inclined side wall 44, an insert that is wedge like in shape may be present and can be disposed within an inclined depression at the bottom of the cup member 36. The plunger 62 may be disposed within the insert and the tightening screw 58 can be actuated so that the insert can move against the cup member 36 and cause upward movement of the cup member 36 to lock the ball 12 in place.

Figure 9:
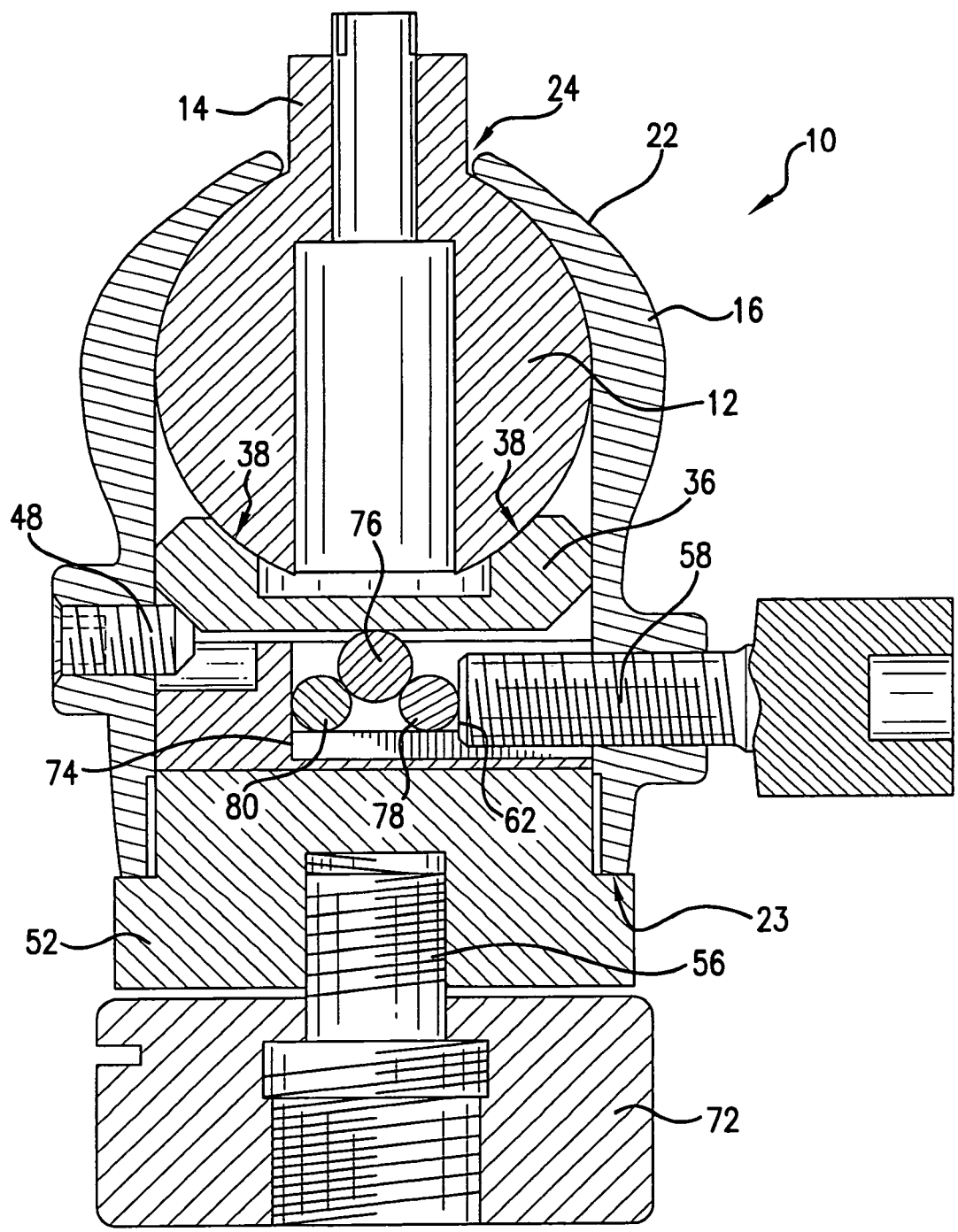
FIG. 9 is a cross-sectional view of an alternative exemplary embodiment of the adjustable joint.

FIG. 9 illustrates an alternative exemplary embodiment of the adjustable joint 10. The ball 12 and ball housing 16 are arranged in substantially the same manner as that previously discussed. A cup member 36 with a cup shaped upper section 38 may engage the outer surface of the ball 12 and force same against the interior of the ball housing 16 as in prior embodiments. An inclined surface of the cup member 36 may engage an inclined surface of the set screw 48 in order to direct and limit the movement of the cup member 36. However, this arrangement may be modified in other embodiments. For example, the radial movement of the cup member 36 may be completely limited by the interior walls of the ball housing 16 so that the cup member 36 engages the interior walls of the ball housing 16 in both a locked and unlocked state.

The mechanism for urging the cup member 36 against the ball 12 and then subsequently against the ball housing 16 is different from that in prior exemplary embodiments. A housing 74 may be included that has a first rod 76. The tightening screw 58 can be present and may be rotated so as to move in a completely radial direction. A plunger 62 may be present at the end of the tightening screw 58. Second and third rods 78 and 80 may be present within the housing 74. The first rod 76 can be located between the second and third rods 78 and 80 and may engage the rods 78 and 80 when the adjustable joint 10 is in the unlocked position. The third rod 80 is positioned against a wall of the housing 74 and is constrained from moving any further in the radial direction due to this engagement with the housing 74. Tightening of the tightening screw 58 causes the plunger 62 to be moved into engagement with the second rod 78 to cause forces to be imparted onto all three of the rods 76, 78, and 80. Continued tightening will cause the middle, first rod 76 to be moved in the vertical, longitudinal direction as the rods 76, 78 and 80 have curved surfaces that are in engagement with one another. The vertical, longitudinal movement will cause the first rod 76 to press against the bottom of the cup member 36 and move same into engagement with the ball 12 to lock the ball 12 against the ball housing 16. The first rod 76 may have a diameter that is greater than the diameter of the second rod 78 and/or the diameter of the third rod 80.

Rotation of the tightening screw 58 so that the plunger 62 disengages the second rod 78 causes the adjustable joint 10 to be released so that the ball 12 can again move with respect to the ball housing 16. Disengagement of the plunger 62 removes forces imparted onto the rods 76, 78 and 80 so that the weight of the cup member 36 and/or the ball 12 and any attached components will push the first rod 76 down and against the second and third rods 78 and 80. The curved surface engagement of the rods 76, 78 and 80 allows the middle first rod 76 to move downward with respect to the second and third rods 78 and 80 so that the first and second rods 76 and 78 will move in the radial direction. The ball 12 may then be moved with respect to the ball housing 16. Although described as employing three rods 76, 78 and 80, it is to be understood that any number of rods may be used in accordance with other exemplary embodiments to effect locking of the adjustable joint 10.

It is to be understood that in FIG. 9, the rods 76, 78 and 80 may rest onto a platform within the housing 74 at locations proximate to their ends and not under their center section so that the plunger 62 can be moved into engagement with the rod 78 without contacting the platform of the housing 74 that supports the rods 76, 78 and 80.

Figure 10:
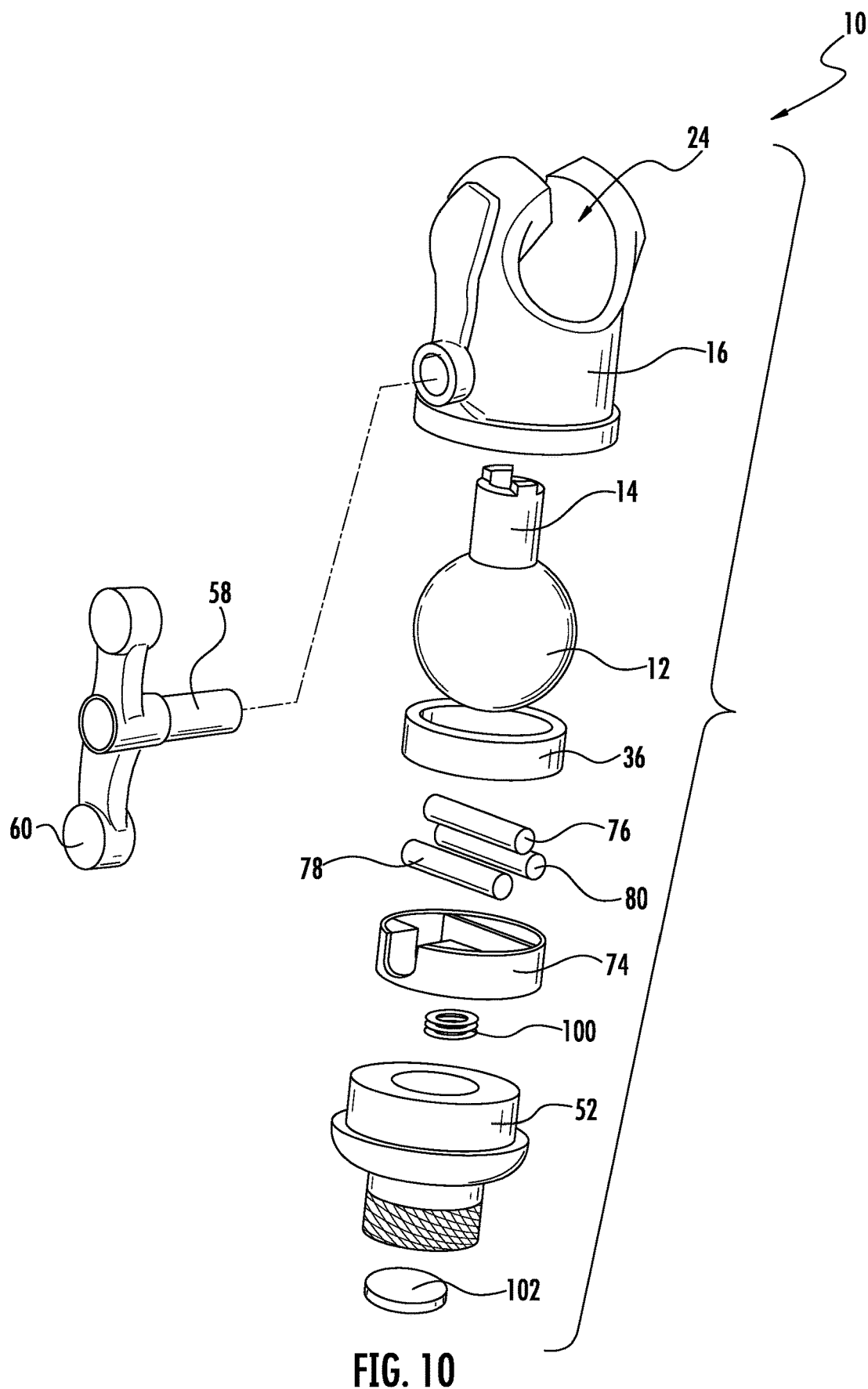
FIG. 10 is an exploded assembly perspective view of an adjustable joint in accordance with another exemplary embodiment.

An alternative exemplary embodiment of the adjustable joint 10 is shown in FIG. 10 and includes components similar to those previously discussed with reference to the embodiment of FIG. 9. The adjustable joint 10 may have a ball housing 16 that can be configured as previously discussed, and a repeat of this information is not necessary. A housing 74 may be included and may house three rods 76, 78 and 80. The second rod 78 is again contacted by the tightening screw 58 and acts against the first and third rods 76 and 80 to cause the cup member 36 to move upwards to in turn move the ball 12 against the ball housing 16 to lock the adjustable joint 10 in place. In this embodiment, the diameter of the second rod 78 can be greater than the diameter of the first rod 76. The diameter of the second rod 78 may also be greater than the diameter of the third rod 80. The first rod 76 and the third rod 80 may have the same diameter as one another. As such, the rod that engages the tightening screw 58 may have a diameter greater than the other rods of the adjustable joint 10. The three rods 76, 78 and 80 may be cylindrical in shape with curved outer surfaces that may engage one another. A spring 100 can be located within the cap member 52 and may be biased upwards in the axial direction so as to urge the housing 74 upwards and against the cup member 36. The cap member 52 may include a bottom portion that has an outer gripping surface capable of being grasped and rotated by the user.

An end piece 102 may also be included in the embodiment of FIG. 10. The end piece 102 may engage the interior of the cap member 52 through a threaded engagement and may be located either within the cap member 52 or on a lower end of the cap member 52. In some arrangements, the spring 100 may engage the cap member 52 such that the spring 100 engages the cap member 52 on its tower end and the housing 74 on its upper end. The spring 100 may be provided in order to help properly position the components of the adjustable joint 10 and may cause the housing 74 to be located in close proximity to the cup member 36 so that the tightening screw 58 will properly engage the second rod 78. The end piece 102 may have a groove, threaded connection, or other member capable of engagement with a column 72 of the microphone stand or other member.

An alternative exemplary embodiment of the adjustable joint 10 is disclosed in FIGS. 11A-11C. The adjustable joint 10 includes several of the features previously discussed with reference to the embodiments in FIGS. 9 and 10, and a repeat of this information is not necessary. However, some of the features in FIGS. 9 and 10 are missing while other new features are added. For example, the embodiment in FIGS. 11A-11C may include the three rods 76, 78 and 80 with the second rod 78 of the largest diameter and engaging the tightening screw 58, but may lack the spring 100. A spacer 104 may be included in the embodiment of FIGS. 11A-11C and can be located in the axial direction between the ball housing 16 and the cap member 52. The spacer 104 may be located on the exterior of the adjustable joint 10 so that it forms a portion of the outer surface of the adjustable joint 10. The spacer 104 may be rigidly attached to the bottom of the housing 16 via a press fit, welded, or threaded connection such that the spacer 104 does not move relative to the housing 16. The cap member 52 may or may not engage the spacer 104 at the bottom end of the spacer 104. The cap member 52, and possibly end piece 102 if present, may rotate relative to the spacer 104 and the housing 16. Relative rotation between the cap member 52 and the spacer 104 may be achieved through a particular connection of these elements or through other means. For example, a groove may be present on the interior of the spacer 104 and a projection of the cap member 52 can be located within this groove and retained therein via projections of the spacer 104 proximate to the groove. In use the user may grasp the bottom graspable portion of the cap member 52 and rotate this component so that internal threads in the interior of the cap member 52 engage complimentary external threading on a column 72 of the microphone stand 132 or other member.

As shown with reference to FIG. 11C, the ball 12 does not include a stem 14 but rather includes a hollow cavity that can be fitted with internal threading. The hollow cavity may extend all the way through the ball 12 or may extend only some distance into the ball 12. A stem 14 or other member of the microphone stand 132 can be screwed onto the internal threading of the cavity of the ball 12 so that some other member may be ached to the adjustable joint 10 to allow the adjustable joint 10 to adjustably position this other member.

Figure 12:
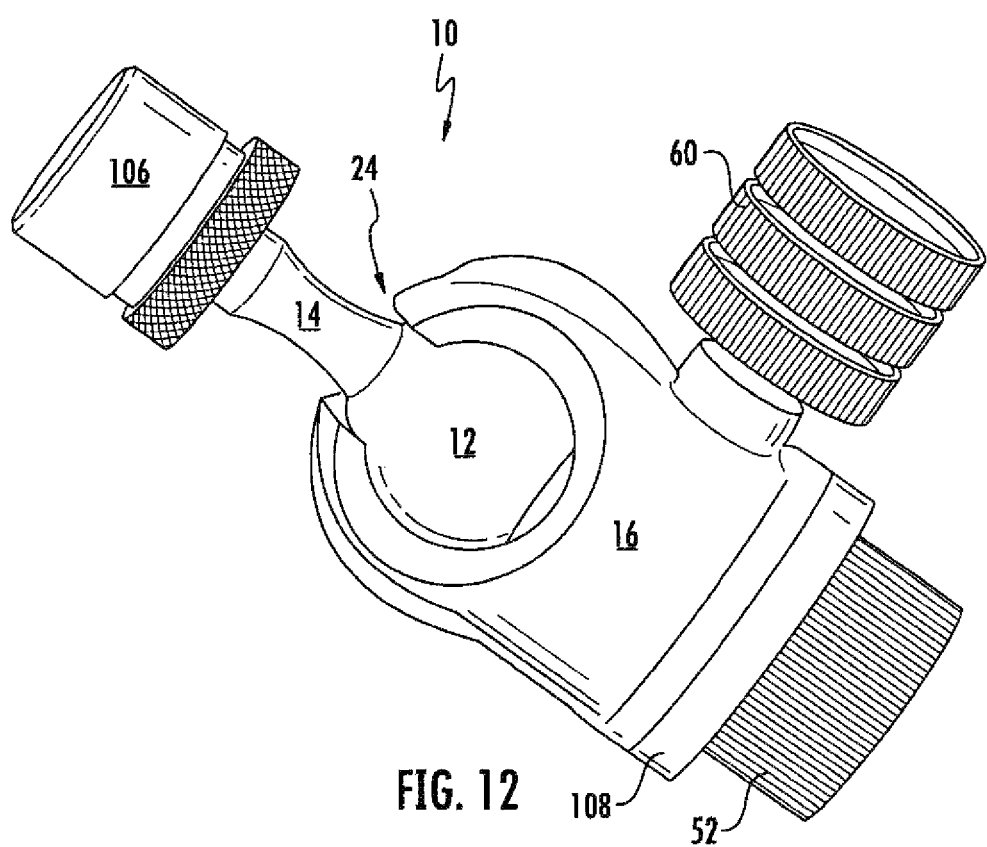
FIG. 12 is a perspective view of an adjustable joint in accordance with one exemplary embodiment.
Figure 13:
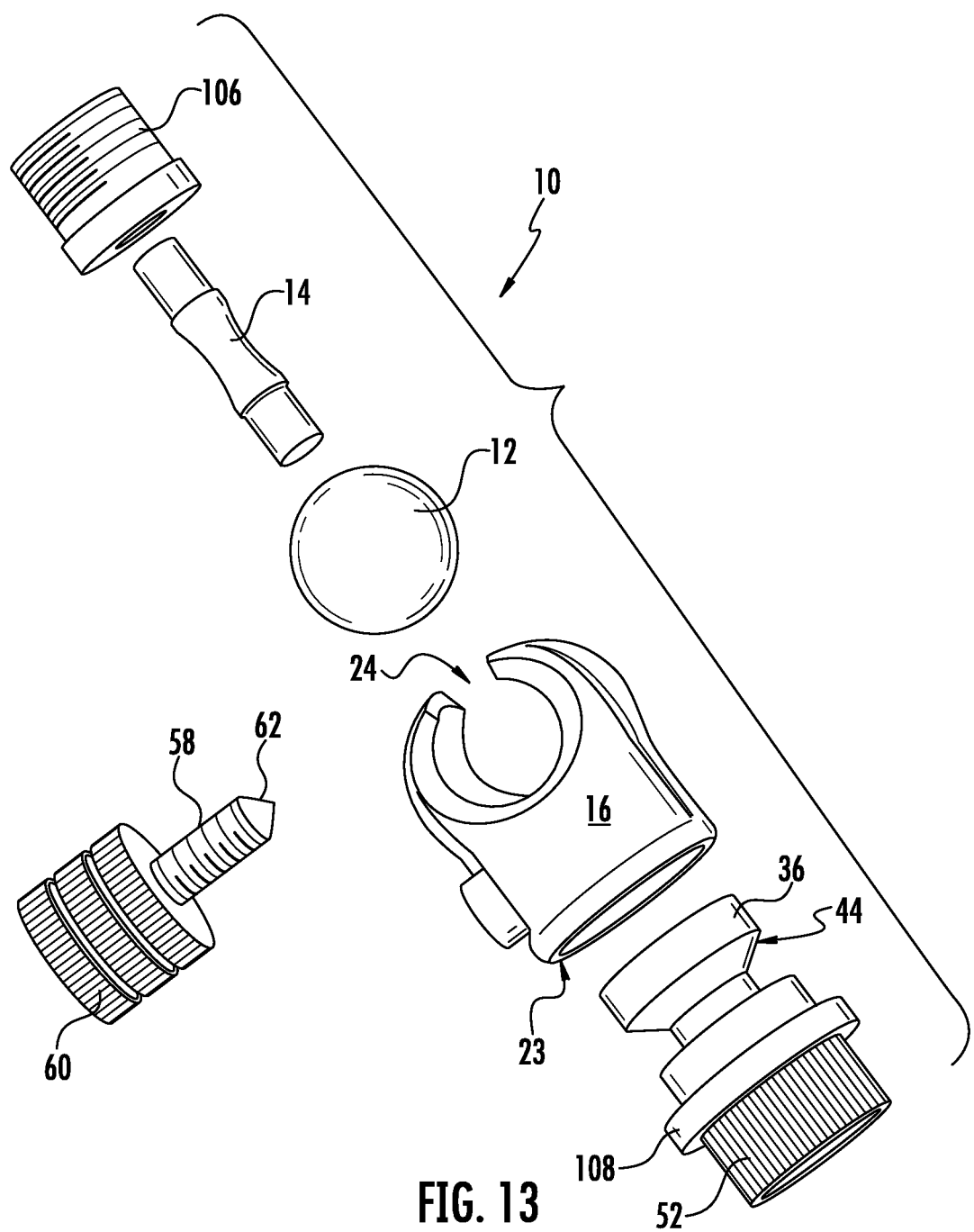
FIG. 13 is an exploded assembly perspective view of the adjustable joint of FIG. 12.

FIGS. 12 and 13 disclose an alternative exemplary embodiment of the adjustable joint 10. The adjustable joint 10 may include a ball housing 16 with a slot 24 as previously discussed and a repeat of this information is not necessary. The stem 14 can be threaded on its lower end and may be received within a cavity of the ball 12. A receiving portion 106 is present on the upper end of the stem 14 and can include external threading on its outer surface that can engage complimentary internal threading of another component of the microphone stand 132. The user may tighten the knob 60 in order to effect locking of the adjustable joint 10 so that the ball 12 and stem 14 are locked into a particular position. The cup member 36 and cap member 52 can be rigidly attached to one another. The members 36 and 52 may be separate components that are rigidly attached to one another via a bolt through their axial centers. Alternatively the cup member 36 and cap member 52 can be welded or integrally formed to one another. Any type of arrangement may be used to cause the cup member 36 and the cap member 52 to be connected to one another so that they are a singly component and do not move relative to one another. The cap member 52 may have a flange 108 arranged on its outer surface that may form the largest portion of the cap member 52 in the radial direction. The flange 108 may directly face the end 23 of the ball housing 16.

Figure 14:
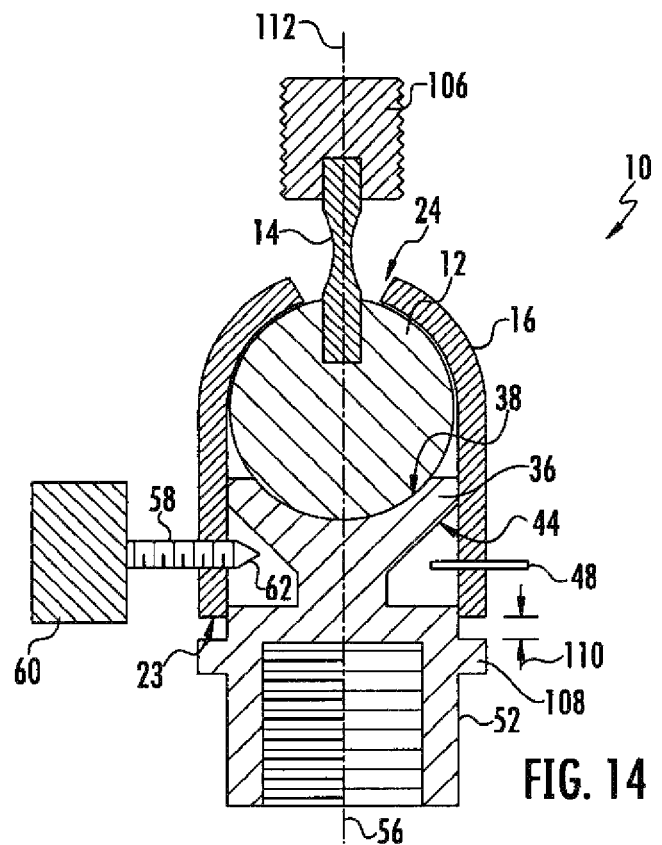
FIG. 14 is a side cross-sectional view of an adjustable joint in accordance with one exemplary embodiment in an unlocked configuration.
Figure 15:
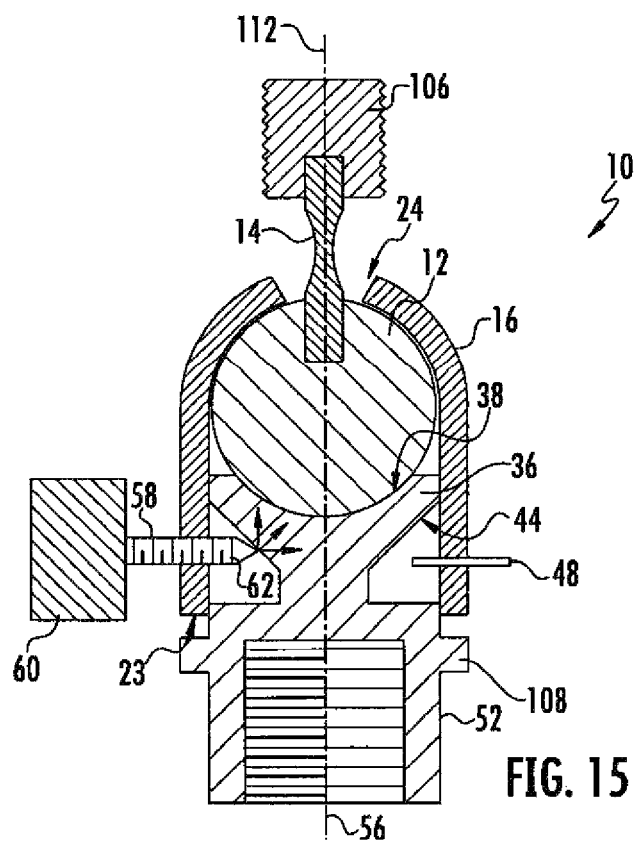
FIG. 15 is a side cross-sectional view of the adjustable joint of FIG. 14 in a locked configuration.

With reference now to FIGS. 14 and 15, cross-sectional views of the adjustable joint 10 of FIGS. 12 and 13 are illustrated. The adjustable joint 10 is shown in an unlocked configuration in FIG. 14 in which the ball 12 can rotate or move freely with respect to the ball housing 16 so that the stem 14 and receiving portion 106 can be moved to a desired position. The plunger 62 of the tightening screw 58 does not engage the cup member 36. The cup member 36 can be retained within the ball housing 16 via the set screw 48. Downward movement of the cup member 36, in this case along the axis 112 of the adjustable joint 10, is limited by the presence of the set screw 48 such that the cup member 36 cannot be removed from the ball housing 16 due to engagement with the set screw 48. Upward movement of the cup member 36 along the axis 112 will be limited due to the presence of the ball 12 and due to the presence of the upper portion of the ball housing 16. Since the cap member 52 is rigidly connected to the cup member 36, the cap member 52 is likewise prevented from being disassembled or removed from the ball housing 16. Although described as being connected through the use of a set screw 48, the cup member 36 and cap member 52 may be retained on the ball housing 16 in a variety of other manners in accordance with other exemplary embodiments.

The cup member 36 and cap member 52 are free to rotate about the axis 112 such that they can rotate freely 360° about the axis 112 and hence rotate relative to the ball housing 16 and/or ball 12. The flange 108 of the cap member 52 and the lower end 23 of the ball housing 16 can be separated from one another some space identified as gap 110. The flange 108 may directly face the end 23 such that no other components are between these two.

In order to lock the adjustable joint 10 into place so that the movement of the ball 12 and stem 14 relative to ball housing 16 is prevented, the user will grasp the knob 60 and rotate same. The tightening screw 58 is in threaded engagement with the ball housing 16 and turning of the knob 60 causes the tightening screw 58 to move in the radial direction towards the axis 112. The plunger 62 at the end of the tightening screw 58 may engage the inclined side wall 44 and the cup member 36 will be forced upwards to cause the ball 12 to be pushed against the interior of the ball housing 16 and locked. The locked position of the adjustable joint 10 is illustrated with reference to FIG. 15. The plunger 62 urges the cup member 36 upwards. Since the cup member 36 is rigidly attached to the cap member 52, the cap member 52 will likewise be drawn upwards along axis 112. This upwards movement of the cap member 52 will cause the gap 110 to be either reduced or eliminated. The flange 108 may contact the end 23 causing the gap 110 to be completely eliminated as shown in FIG. 15. However, it is to be understood that in the locked position the gap 110 may still be present but reduced in size from that in the unlocked position of the adjustable joint 10 in other exemplary embodiments.

Although described as being moved upwards upon moving from the unlocked to the locked position, the cup member 36 need not move upwards in other exemplary embodiments. For example, the receiving portion 56 can be attached to a stand or other component of the microphone stand 132 in some arrangements. There may be a great deal of weight attached to the receiving portion 56 thus preventing the cap member 52 and cup member 36 from moving upwards in the axial direction 112. Tightening of the tightening screw 58 may cause the ball housing 15 to be moved downwards in the axial direction 112. Further, combinations of movement between the ball housing 16 and cup member 36 may exist in other embodiments. The relative motion in the adjustable joint 10 may be to cause these members to be moved towards one another in the axial direction 112 upon locking of the adjustable joint 10.

FIGS. 16A-16C disclose an alternative exemplary embodiment of the adjustable joint 10. The adjustable joint 10 may include features previously discussed with reference to the exemplary embodiment in FIGS. 12-15. A tightening ring 114 can be present on the external threading of the receiving portion 106. The tightening ring 114 can be adjusted along the length of the receiving portion 106 as desired. Attachment of a component to the receiving portion 106 may be made, and the tightening ring 114 can be rotated by the user so that the tightening ring 114 is brought into tight engagement with the attached component to effect a more secure connection. In other arrangements, the tightening ring 114 can be used to demarcate a lower end of the receiving portion 106, or may be used for other purposes as desired.

Figure 17:
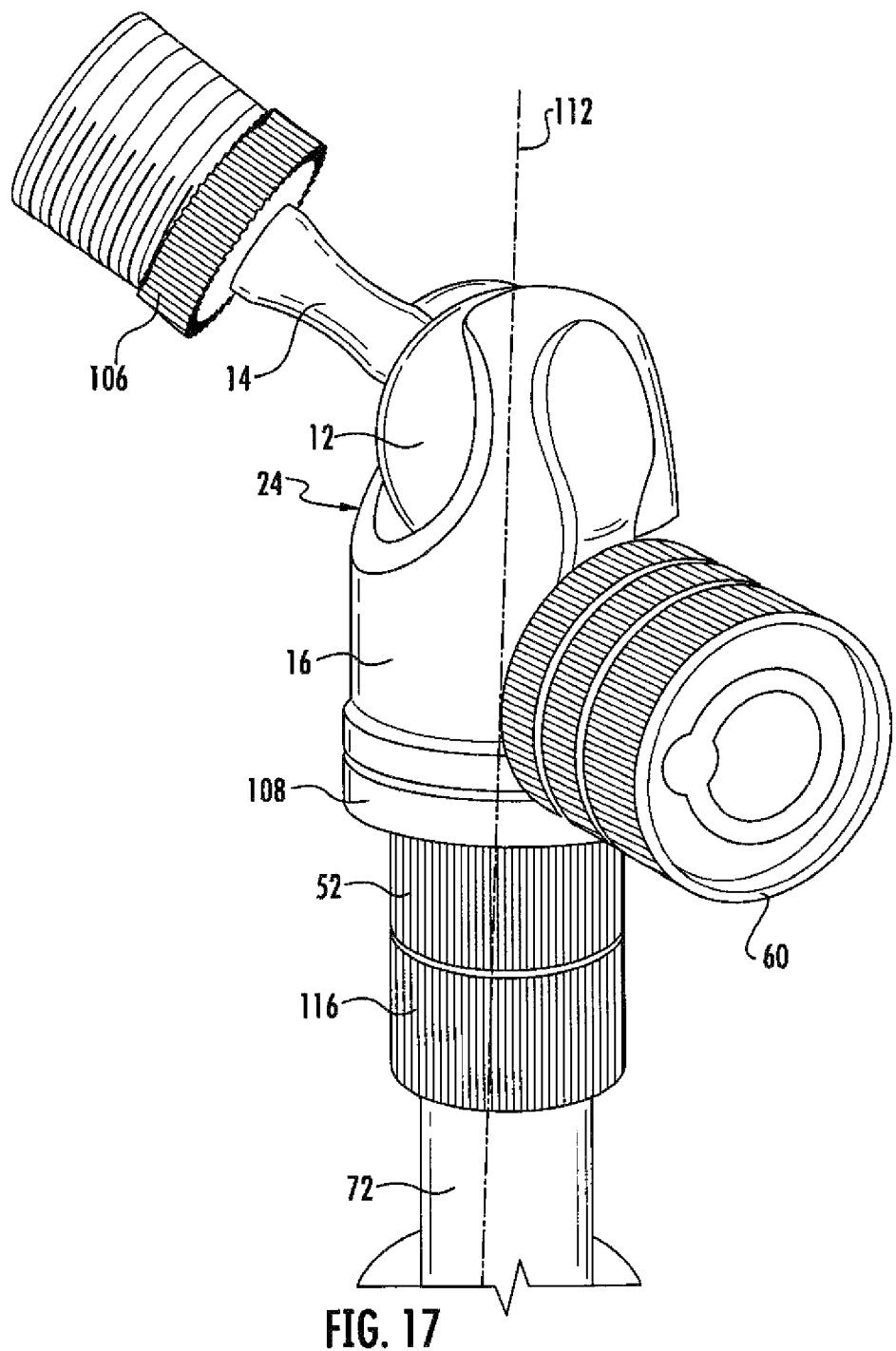
FIG. 17 is a perspective view of an adjustable joint in accordance with another exemplary embodiment.

FIG. 17 is a perspective view of another exemplary embodiment of the adjustable joint 10. The adjustable joint 10 is connected to the top of a column 72. A connecting portion 116 at the top of the column 72 may include male threading that engages the complimentary female threading of the cap member 52. The user may position the adjustable joint 10 onto the connecting portion 116 and rotate the cap member 52 which will cause the shoulder 108 to likewise rotate but will not cause rotation of the ball housing 16 or ball 12. The connecting portion 116 and an outer surface of the cap member 52 can be provided with grooves oriented in a direction perpendicular to the axis 112 to act as finger grips to assist the user in grasping and rotating these portions to effect attachment. The remaining components can be as previously disclosed and their description need not be repeated. It is noted that the stem 14 is positioned within the slot 24 and locked in the slot 24 within a wider portion of the slot 24 and such that the axis of the stem 14 is not perpendicular to axis 112.

Figure 18C:
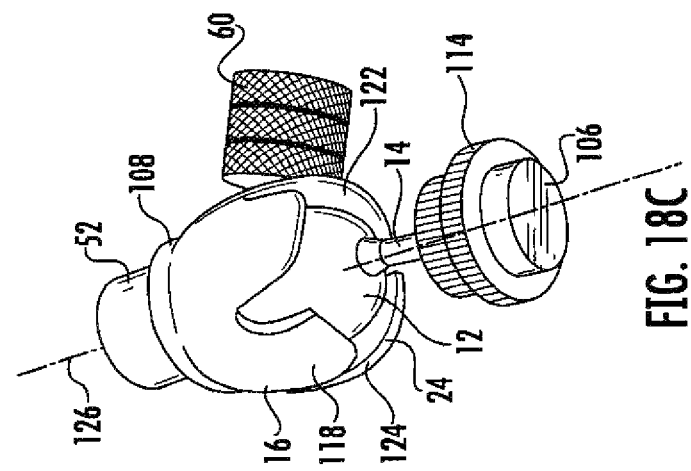
FIG. 18C is a top perspective view of the adjustable joint of FIG. 18A.
Figure 18B:
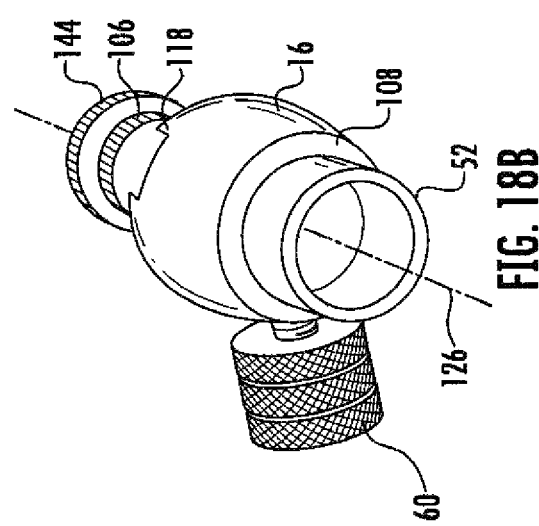
FIG. 18B is a bottom perspective view of the adjustable joint of FIG. 18A.
Figure 18A:
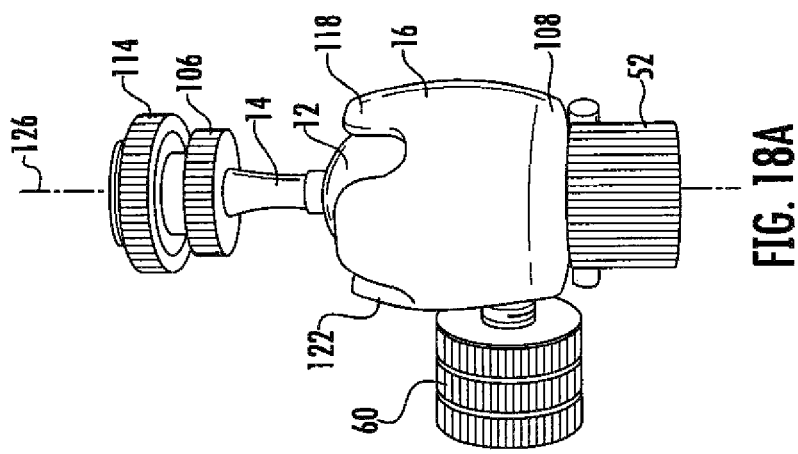
FIG. 18A is a font view of an adjustable joint in accordance with one exemplary embodiment.

An alternative exemplary embodiment of the adjustable joint 10 is shown in FIGS. 18A-18C. The components of the adjustable joint 10 may be provided and operate as previously discussed and a repeat of this information is not necessary. However, the ball housing 16 may be designed differently than in previously exemplary embodiments and may allow for additional functionality. The slot 24 may be shaped differently than the slot 24 in other exemplary embodiments. The slot 24 may include four slot portions 118, 120, 122 and 124 into which the stem 14 may be disposed. Once in one of the slot portions 118, 120, 122 or 124, the stem 14 and hence ball 12 and receiving portion 106 cannot rotate about the axis 126 of the ball housing 16. The slot portions 118, 120, 122, and 124 are defined on their bottoms and sides by the ball housing 16 such that they may be made just wide enough to accommodate the stem 14 and prevent the stem 14 from moving generally left for right, and more particularly about the axis 126. However, the upper ends of the slot portions 118, 120, 122 and 124 are open to allow the stem 14 to be moved up out of the slot portions 118, 120, 122 and 124 such that the stem 14 can in fact rotate about an axis of rotation perpendicular to the axis 126. The remaining portion of the slot 24 is open such that essentially the entire end 22 of the ball housing 16 is open.

The ball housing 16 may be shown with greater detail with reference to FIGS. 19A-19E. The front side 18 of the ball housing 16 is shown with reference to FIG. 19A and the first slot portion 118 is illustrated. The stem 14 can be moved into the first slot portion 118 by the user and the user may then use the microphone stand 132 without having to actually tighten the tightening screw 58 or otherwise lock the adjustable joint 10. Although the stem 14 and any attached components may rotate upwards out of the first slot portion 118, the adjustable joint 10 may be arranged so that gravity causes the stem 14 and attached components to be pulled down to the bottom of the first slot portion 118 in the direction along axis 126. Therefore, the natural position of the stem 14 will be to engage the bottom of the ball housing 16 forming the first slot portion 118. The stem 14 will be prevented from rotating about the axis 126 due to the left and right side walls of the ball housing 16 forming the first slot portion 118. The stem 14 can thus be prevented from moving even if the locking mechanism is not actuated and the adjustable joint 10 is in the unlocked position. The first slot portion 118 may allow for a known positioning to be achieved for the component held by the adjustable joint 10 so that the user can quickly and accurately locate the stem 14 and attached component during use.

Figure 19A:
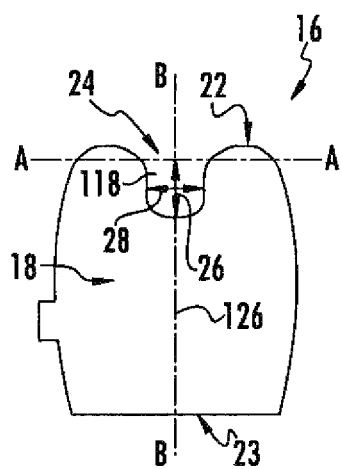
FIG. 19A is a front side view of a ball housing in accordance with one exemplary embodiment.
Figure 19B:
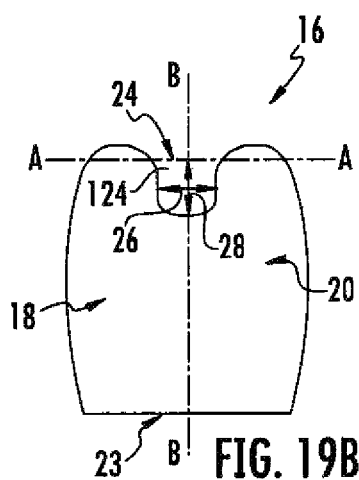
FIG. 19B is a right side view of the ball housing of FIG. 19A.
Figure 19C:
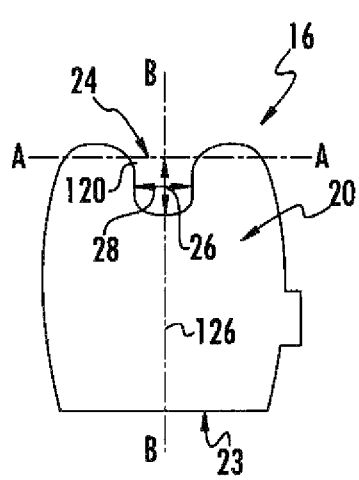
FIG. 19C is a back side view of the ball housing of FIG. 19A.
Figure 19D:
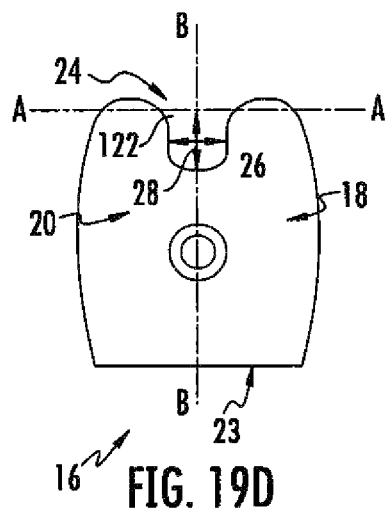
FIG. 19D is a left side view of the ball housing of FIG. 19A.
Figure 19E:
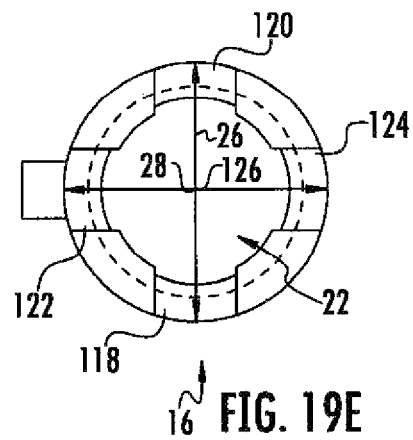
FIG. 19E is a top view of the ball housing of FIG. 19A.

The remaining second, third and fourth slot portions 120, 122 and 124 are shown with reference to FIGS. 19B-19D and can be arranged and can function in a manner similar to that of the first slot portion 118 so that different known or set locations of the stem 14 and attached component can be realized. A top view of the ball housing 16 is shown in FIG. 19E. The first and second slot portions 118 and 120 are located 180° from one another about axis 126 and demarcate the terminal ends of the slot 24 and thus its entire length 26. The third and fourth slot portions 122 and 124 are 180° from one another and are both 90° from the first and second slot portions 118 and 120. The third and fourth slot portions 122 and 124 demarcate the widest point of the slot 24 and thus the widest width 28 of the slot 24.

The remaining portion of the slot 24 outside of the slot portions 118, 120, 122, and 124 may represent generally the entire end 22 of the ball housing 12 minus some amount of the ball housing 12 that extends between the slot portions 118, 120, 122 and 124. This portion of the slot 24 can be circular in shape as illustrated with reference to FIG. 19E. All of the slot portions 118, 120, 122 and 124 may be the same size as one another or may be variously sized in accordance with different exemplary embodiments. Although described as not being locked when in the slot portions 118, 120, 122 and 124, the stem 14 may in fact be locked when located within one of these portions 118, 120, 122 or 124. It is to be understood that depending upon how the ball housing 16 is oriented with respect to the ground, the stem 14 and components mounted to the stem 14 may or may not have a natural tendency to remain within the slot portions 118, 120, 122 or 124. In some instances, the stem 14 and mounted components will have a tendency to remain in one or more of the slot portions 118, 120, 122 and/or 124 and will have a tendency to fall out of or not remain in the remaining slot portions 118, 120, 122 and/or 124. Further, although described as being symmetrically located about the axis 126 and being four in number, the slot portions 118, 120, 122 and 124 can be variously positioned about the axis 126 or may be provided in any number. For example, from 1-5, from 5-10, from 10-20, or up to 30 slot portions may be provided in accordance with other exemplary embodiments.

Figure 20:
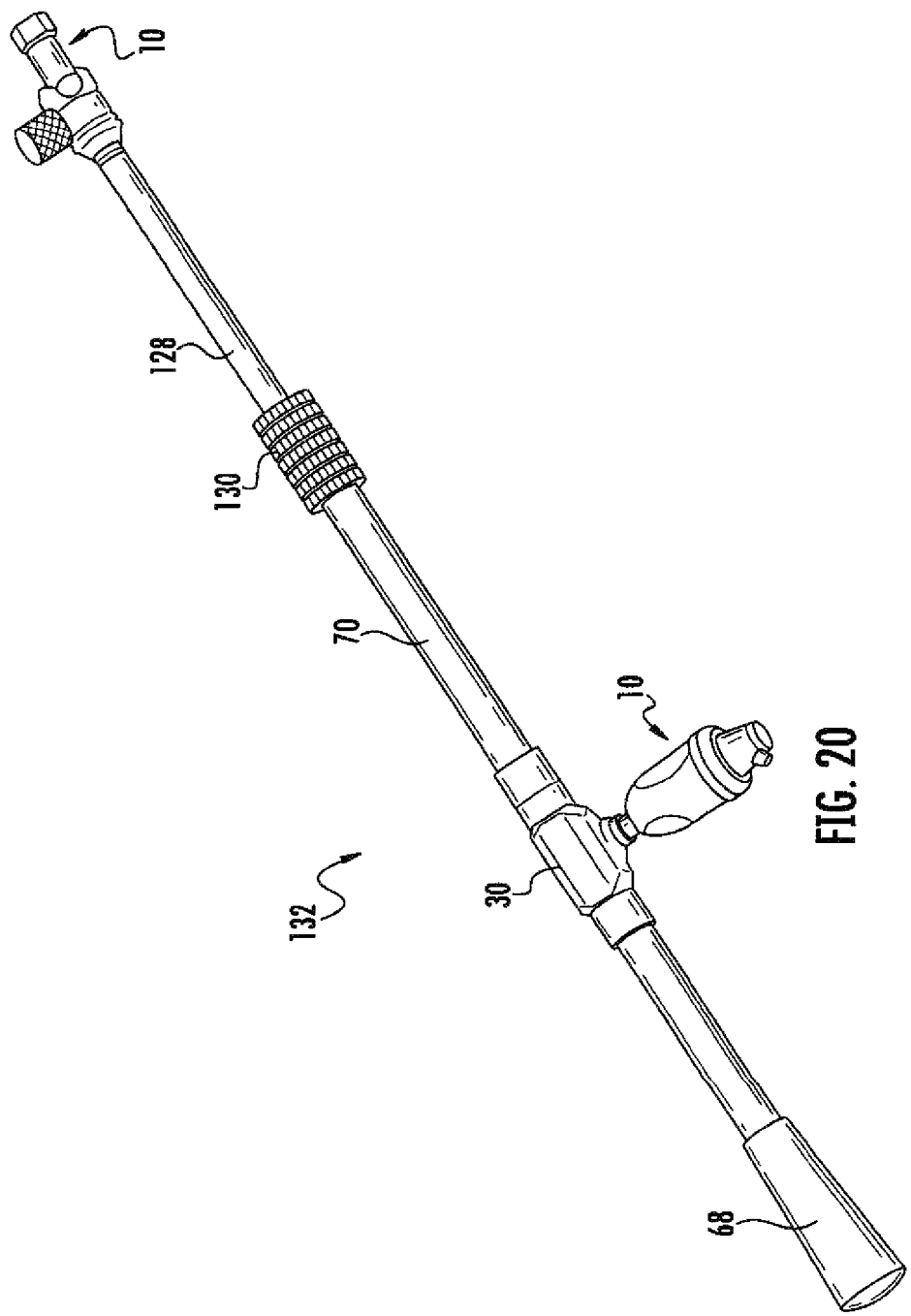
FIG. 20 is a perspective view of a microphone stand that includes an adjustable joint and a boom.

FIG. 20 discloses an upper portion of a microphone stand 132 in which a pair of the adjustable joints 10 are included and incorporated for use with a boom 70. The first adjustable joint 10 is attached to a boom clutch 30 of the microphone stand 132 on its upper end, and may be attached to a column 72 (not shown) on its lower end. This first adjustable joint 10 can be configured and provided as per the various embodiments illustrated and discussed with reference to FIG. 10. A counterweight 68 is on one side of the boom clutch 30, and a telescoping arm 128 can be present on an opposite side of the boom clutch 30. The user may grasp and rotate a rocking member 130 in order to extend and retract the telescoping arm 128 as desired to achieve a preferred length of this portion of the boom 70. The user may adjust the locking member 130 so that the telescoping arm 128 is locked into place once it is extended to its desired length. A second adjustable joint 10 can be attached to an end of the telescoping arm 128. The second adjustable joint 10 can be configured and provided as per the various embodiments illustrated and discussed with reference to FIGS. 11-17. A microphone or other portion of the microphone stand 132 may be attached to the second adjustable joint 10. The two adjustable joints 10 can be adjusted into desired positions so that the boom 70 and other components of the microphone stand 132 are likewise placed into desired locations during use.

FIGS. 21A-21C disclose a portion of a microphone stand 132 in accordance with one exemplary embodiment. The adjustable joint 10 is included and may be arranged to include components of previous exemplary embodiments. The ball housing 16 may be as that disclosed with respect to FIGS. 18 and 19. The internal components of the adjustable joint 10 that allow the ball 12 to be rocked and unlocked may be as that disclosed in any of the exemplary embodiments described herein and a repeat of this information is not necessary. The adjustable joint 10 may be attached to a pivoting joint 134 through a threaded connection at the cap member 52. Other types of connection may be made to effect attachment of the adjustable joint 10 to the pivoting joint 134.

The pivoting joint 134 is adjustable about a pivoting axis 136 that is perpendicular to the axis 126 of the ball housing 16 illustrated in previous figures. The pivoting joint 134 may include a first section 138 that is in pivoting engagement with a second section 140. The sections 138 and 140 can be placed into sliding engagement through a race type connection, or may feature interlocking teeth. The first section 138 may be the portion of the pivoting joint 134 that is in engagement with the adjustable joint 10 such that the adjustable joint 10 is carried by the first section 138. The user may rotate the first section 138 about the axis 136 relative to the second section 140 to a desired location so that the adjustable joint 10 is moved to a desired location. Rotation about axis 136 is illustrated upon comparison of FIGS. 21A, 21B and 21C.

Once the first section 138 has been rotated to a desired position, a tightening screw 142 disposed through the first and second sections 138 and 140 can be tightened. This action causes the first and second sections 138 and 140 to be drawn against one another or to be more tightly held into engagement with one another such that they are locked in place and cannot rotate relative to one another about the axis 136. However, it is to be understood that other arrangements of causing the first and second sections 138 and 140 to be locked can be employed in other versions. For instance, previously described techniques for locking the adjustable joint 10 may be used. The pivoting joint 134 may be arranged so that it can pivot about axis 134 but cannot pivot about any other axis.

The adjustable joint 10 can be attached to the pivoting joint 134 so that the cap member 52 is not capable of rotating relative to the pivoting joint 134. The stem 14 is located within the first slot portion 118 in FIG. 21A and its movement is restrained in certain directions even if the adjustable joint 10 is not locked. Although capable of rotating forward in FIG. 21A, the stem 14 and attached receiving portion 106 cannot rotate to the left or right or backwards due to the arrangement of the first slot portion 118 in the ball housing 16. In FIG. 21B, the stem 14 remains in the first slot portion 118 and is restrained from moving down, to the left or to the right. The stem 14 may move upwards in FIG. 21B, but this may only be true if a user actually applies force to the stem 14 or components carried by the stem 14 because of the weight of these devices. In FIG. 21C, the stem 14 is partially within the second slot portion 120 and partially within a section of the slot 24 that does not define any of the slot portions 118, 120, 122 and 124. The adjustable joint 10 is locked in FIG. 21C.

Figure 22:
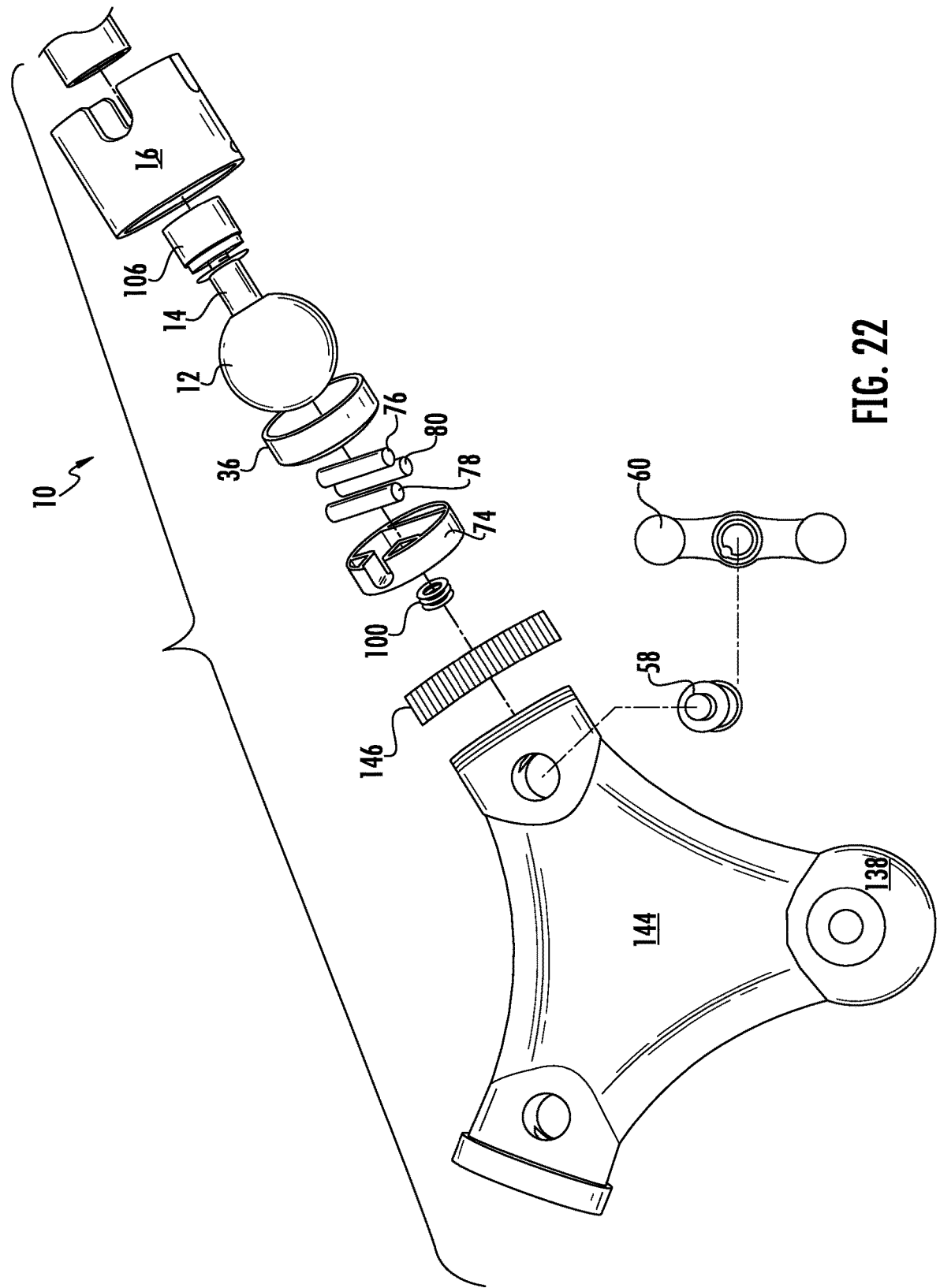
FIG. 22 is a side exploded assembly view of an adjustable joint in accordance with one exemplary embodiment.

Another exemplary embodiment of the adjustable joint 10 is shown in FIG. 22 in which the adjustable joint 10 may be affixed to a dual mic frame 144. The adjustable joint 10 can include components previously discussed such as those disclosed and described with respect to FIG. 10. However, the cap member 52 may be either missing or modified from that in previously disclosed embodiments. Portions of the dual mic frame 144 may function as the cap member 52 and a locking member 146 may engage the dual mic frame 144 through a threaded engagement and may function to help, retain certain components of the adjustable joint 10. The tightening screw 58 can be disposed through an aperture of the dual mic frame 144 to engage the second rod 78 which may have a larger diameter than the first rod 76 and the third rod 80. The use of a rod 78 that engages the tightening screw 58 that is of a greater diameter than the other rods 76 and 80 that do not engage the tightening screw 58 may cause a greater amount of pressure to be applied to the cup member 36 upon tightening the tightening screw 58.

Figure 23:
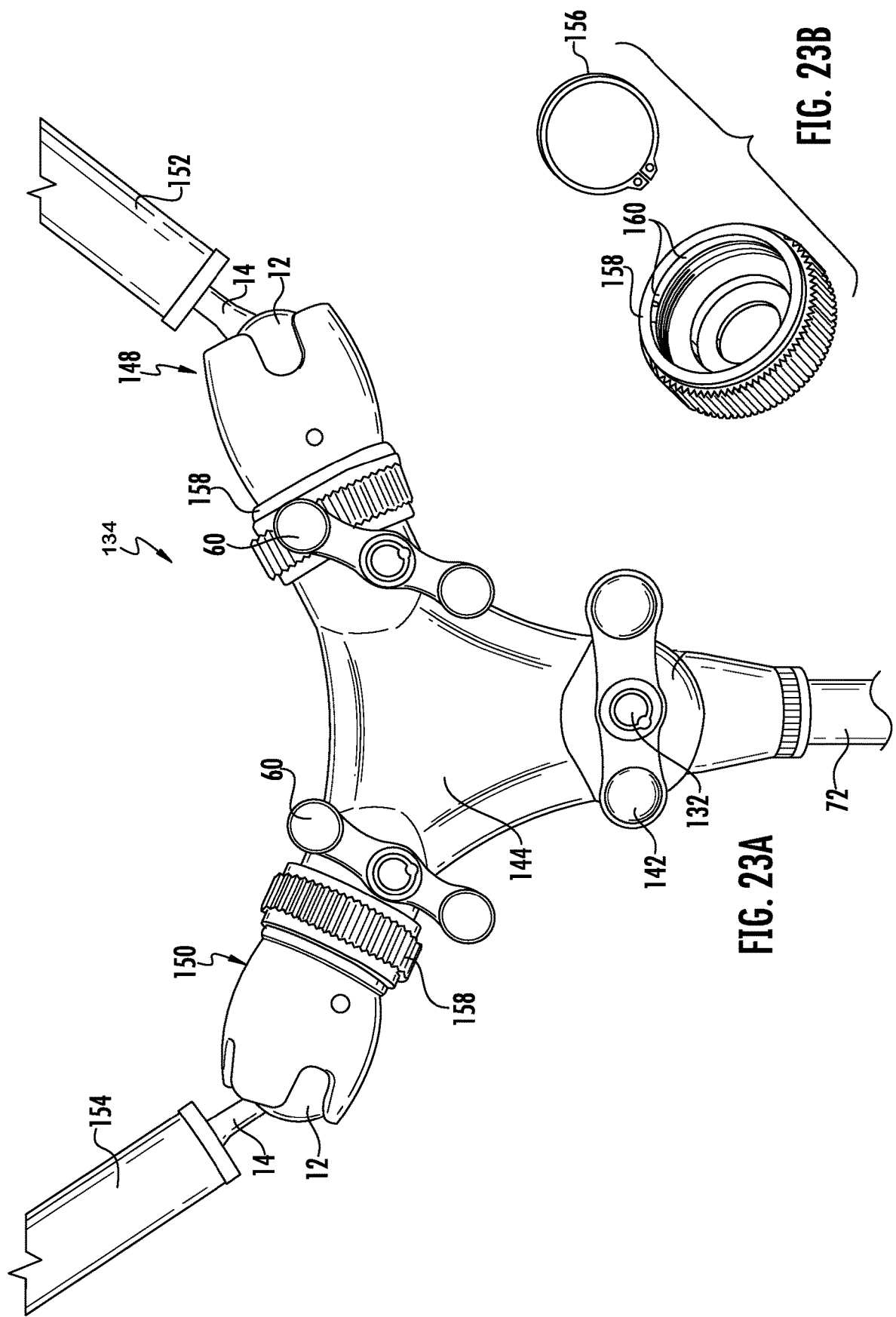
FIG. 23A is a side view of a microphone stand with a dual mic frame mounted onto a column in accordance with one exemplary embodiment.
FIG. 23B is an exploded view of a control knob and snap ring used to connect components seen in FIG. 24A.

An alternative arrangement of the microphone stand 132 is shown in FIG. 23A. The microphone stand 132 includes a dual mic frame 144 that is mounted onto a column 72 by way of a pivoting joint 134. Although not shown, a base may be located at the bottom of the column 72 for supporting the other components of the microphone stand 132. The pivoting joint 134 allows the dual mic frame 144 to pivot with respect to the column 72 about the axis 136 so that any components of the microphone stand 132 supported by the dual mic frame 144 will also be pivoted about the axis 136. The dual mic frame 144 is designed to be capable of holding two microphones 66 (not shown). In this regard, one of the microphones 66 can be used for a drummer of a band while the other microphone 66 can be positioned for use with a guitarist or lead singer. The microphones 66 can be directly connected to the dual mic frame 144, or adjustable joints 10 or other components may be included to allow for the microphones 66 to be properly positioned. As shown, the dual mic frame 144 is directly attached to a first adjustable joint 148 that can in turn be connected to a first arm 152. A microphone 66 (not shown) may be located at the end of the first arm 152, or additional arms or adjustable joints may be located at the end of the first arm 152. The first adjustable joint 148 may be adjusted so that the stem 14 and hence first arm 152 are moved to a desired position. The knob 60 associated with the first adjustable joint 148 can be tightened to lock the position of the ball 12 of the first adjustable joint 148 in place.

A second adjustable joint 150 may be included and can extend from a side of the dual mic frame 144 opposite the first adjustable joint 148. A second arm 154 can be connected to the stem 14 of the second adjustable joint 150 and a microphone 66 (not shown) may be mounted on the second arm 154 or may be attached to other components that are in turn mounted to the second arm 154. The positioning of the second microphone 66 may be achieved by positioning the ball 12 and stem 14 of the second adjustable joint 150. The second adjustable joint 150 can be locked into place upon actuation of the knob 60 associated with the second adjustable joint 150. Control knobs 158 may be provided and may be used to effect connection of the adjustable joints 148 and 150 to the dual min frame 144. The control knobs 158 may be threaded onto the dual mic frame 144 and may be provided with a thread stop 160 to prevent the user from being able to remove the control knobs 158 from the dual mic frame 144. Additionally or alternatively, a snap ring 156 (FIG. 23B) may be used to cause the control knobs 158 to be attached to the dual mic frame 144 so that they cannot be removed by the user. In other arrangements, the user may be able to remove the control knobs 158 from the dual mic frame 144. The user may remove the first and/or second adjustable joints 148/150 from the dual mic frame 144 and can attach other components or no components of the microphone stand 132 to the dual mic frame 144 if desired. Although the adjustable joints 146 and 150 may be removably attached to the dual mic frame 144, they may be permanently attached to the dual mic frame 144 in other exemplary embodiments.

Figure 24:
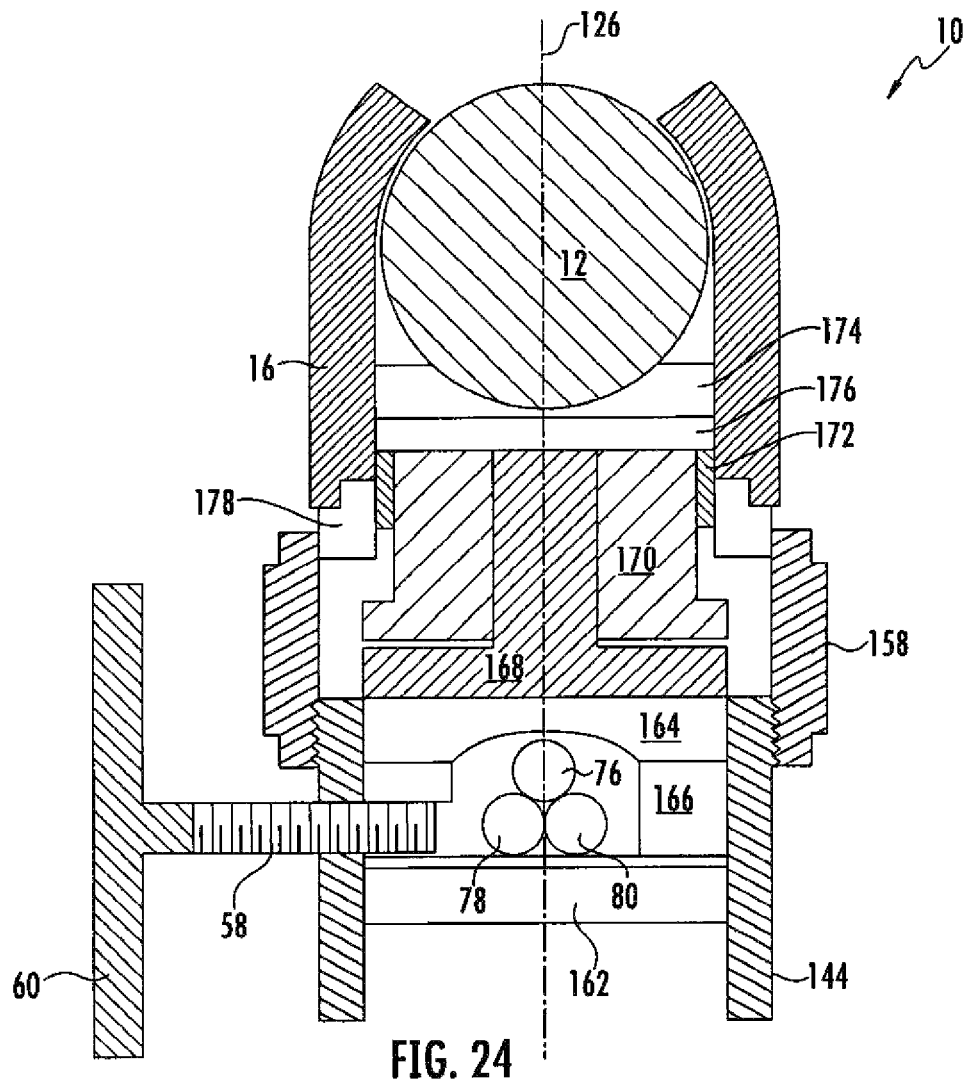
FIG. 24 is a cross-sectional view of an adjustable joint in accordance with another exemplary embodiment.

Another exemplary embodiment of an adjustable joint 10 is shown in cross-sectional view in FIG. 24. This adjustable joint 10 may be the one shown as the first and second adjustable joints 148 and 150 in FIG. 23A, or one or both of the adjustable joints 148 and/or 150 can be different than the one disclosed in FIG. 24. A plate 162 may be present within an open end of the dual mic frame 144 and an aperture can be disposed through the dual mic frame 144 at this location so that a tightening screw 58 can be inserted into and moved within the interior of the dual mic frame 144. The adjustable joint 10 may include a housing 74 that has an upper section 164 and a tower section 166 that contact one another. The lower section 166 may rest on the plate 162 and may or may not be permanently attached to the plate 162. The three rods 76, 78 and 80 may be housed between the upper and lower sections 164 and 166. The three rods 76, 78 and 80 may have the same length and diameter, or the diameter of the second rod 78 that engages the tightening screw 58 can be larger than the diameter of either of the rods 76 or 80 that may have the same diameter as one another. The adjustable joint 10 in FIG. 24 is shown in an unlocked state. Movement of the tightening screw 58 towards the rods and into engagement with the second rod 78 pushes the third rod 80 to the right in FIG. 24 and causes the first rod 76 to move upwards and thus in the direction along axis 126. Upward movement of the first rod 76 pushes the first rod 76 against the bottom of the upper section 164 and in turn causes the upper section 164 to move upwards in the direction along axis 126.

The adjustable joint 10 may include a movable plunger 168 that has a face that engages the upper surface of the upper section 164. Movement of the upper section 164 along the axis 126 causes the movable plunger 168 to likewise move upwards in the direction of the axis 126. The top of the rod of the movable plunger 168 engages a plate 176 that in turn will be urged upwards upon upward movement of the movable plunger 168. A ring cup 174 may be located on top of the plate 176 and a portion of the bottom of the ball 12 can rest within the ring cup 174. Upward movement of the plate 176 acts on the ring cup 174 to in turn cause it to move upwards in the direction of axis 126. This action is transferred to the ball 12 to push the ball 12 upwards in the direction of axis 126 and against the interior of the ball housing 16 to lock the ball 12 in place relative to the ball housing 16.

Reversal of the tightening screw 58 causes a reversal of the abovementioned movements so that the adjustable joint 10 becomes unlocked to allow the ball 12 to move relative to the ball housing 16. Pulling the tightening screw 58 away from the second rod 78 causes the pressure on the first rod 76 to be released to allow it to move downwards in the direction of axis 162. This likewise causes the upper section 164 to move downwards, the movable plunger 168 to move downwards, and then the plate 176 to move downwards. Since pressure is no longer being applied to the ring cup 174, the ring cup may move downwards as well to thus remove pressure on the ball 12 to allow the ball 12 to move. Gravity is not needed to effect this unlocking. The movable portions of the adjustable joint 10 can be placed into a condition in which they are loose to allow the ball 12 to move within the ball housing 16 based upon a minimum amount of force being applied by the user to push the ball 12 within the ball housing 16 back and forth.

The remaining components of the adjustable joint 10 may function to connect the ball housing 16 to the dual mic frame 144 and to provide a housing for the movable portions of the adjustable joint 10 between locking and unlocking. An insert piece 170 may house the rod portion of the movable plunger 168. The insert piece 170 may be made in some embodiments so that it is not movable with respect to the dual mic frame 144 thus allowing the movable plunger 168 to move relative to the insert piece 170. A ring 172 may be included and may be rigidly attached to the insert piece 170 so that the insert piece 170 does not move relative to the ring 172. This attachment may be a press fit connection, a threaded connection, or a welded connection in various arrangements. An attachment component 178 may be included and the ball housing 16 may be threaded onto the attachment component 178 to cause it to be attached, or may be attached via any other method. The attachment component 178 may be rigidly attached to the ring 172 so that the ring 172 cannot move with respect to the attachment component 178.

The control knob 158 may be attached to the attachment component 178 so that when attached they do not move relative to one another. This attachment may be via a threaded connection or by any other means. The control knob 158 may be capable of being removed from the control knob 158, or the control knob 158 and the attachment component 178 may be permanently attached to one another so that the user cannot remove these components. The control knob 158 may be capable of engaging the dual mic frame 144. This engagement may be via external threading on the end of the dual mic frame 144 that can engage complimentary internal threading of the control knob 158. The user may be able to attach and detach the control knob 158 from the dual mic frame 144. However, in some arrangements, the control knob 158 can be fitted with a snap ring 156 or a thread blocking member to prevent the user from removing the control knob 158. When attached, the control knob 158 does not move relative to the attachment component 178 or the dual mic frame 144 and the movable portions of the adjustable joint 10 move relative to the control knob 158 when they are moved between the locked and unlocked positions. Again, it is to be understood that the components illustrated and described in FIG. 24 are only exemplary and that other arrangements or components are possible in other exemplary embodiments.

Figure 25:
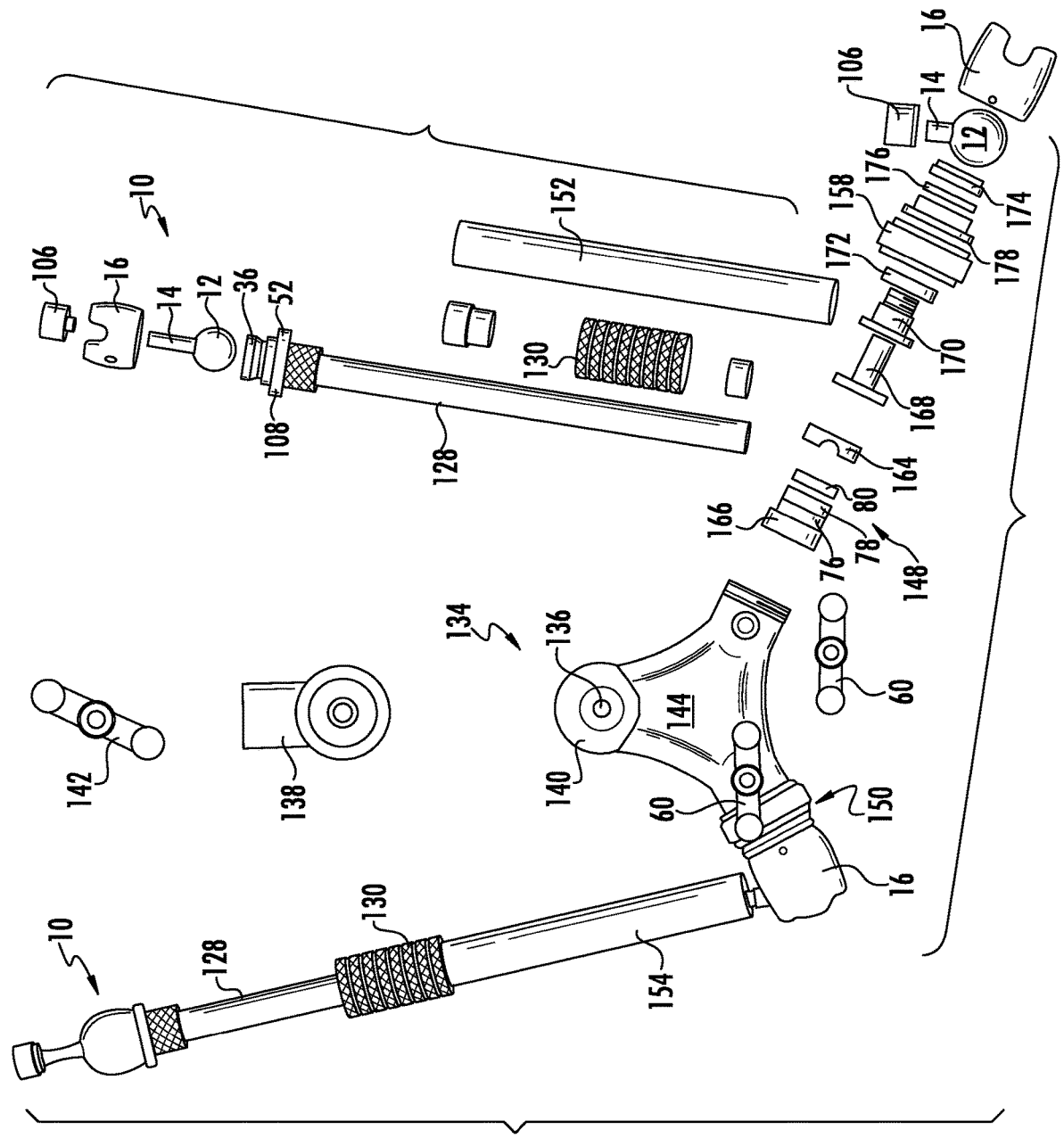
FIG. 25 is a partial side exploded assembly view of a microphone stand that includes a dual mic frame, pivoting joint, first adjustable joint, second adjustable joint, and adjustable joints in accordance with another exemplary embodiments.

Another exemplary embodiment of the microphone stand 132 is disclosed in FIG. 25 in which a dual mic frame 144 is included and is capable of being attached to two adjustable joints 148 and 150. The adjustable joints 148 and 150 may be the same as one another or different from one another in their construction. The dual mic frame 144 is triangular in shape with two legs receiving the adjustable joints 148 and 150 and with the third leg arranged as the pivoting joint 134. The pivoting joint 134 includes a first section 138 that engages a second section 140 that can be a portion of the dual mic frame 144. A column 72 (not shown) or other portion of the microphone stand 132 can be attached to the first section 138 and may be rotated relative to the dual mic frame 144. The tightening screw 142 can be tightened to draw the sections 138 and 140 lightly into engagement with one another to prevent the pivoting joint 134 from moving.

The dual mic frame 144 may receive a first adjustable joint 148 that is shown in exploded view in FIG. 25. The ball housing 16 may be as that disclosed and discussed relative to FIGS. 18 and 19. The components of the first adjustable joint 148 may include a housing with a lower section 166 and upper section 164 that contains rods 76, 78 and 80. The first adjustable joint 148 may also include a movable plunger 168, an insert piece 170, ring 172, control knob 158, attachment component 178, plate 176, ring cup 174, ball 12, stem 14, and receiving portion 106. The aforementioned components may be arranged and function as previously discussed with respect to other exemplary embodiments, or may be differently arranged and function differently than those previously discussed. The first arm 152 may be attached to the receiving portion 106 and can be moved and positioned due to the adjustability and locking ability of the first adjustable joint 148. A locking member 130 may be carried by the first arm 152 and can be used to extend the length of the telescoping arm 128 relative to the first arm 152. The user may spin the locking member 130 to release pressure on the telescoping arm 128 to allow it to be extended relative to the first arm 152 to a desired degree. The user may then tighten the locking member 130 to lock the position of the telescoping arm 128 relative to the first arm 152. An adjustable joint 10 can be attached to the end of the telescoping arm 128. This adjustable joint 10 can be configured the same as that previously disclosed with reference to FIG. 18. However, the adjustable joint 10 can be variously configured and include components and configurations in any manner as disclosed herein. A microphone 66 (not shown) or other component of the microphone stand 132 can be attached to the receiving portion 106.

A second adjustable joint 150 may be included on the dual mic frame 144 on the third leg of the dual mic frame 144. The second adjustable joint 150 may be configured the same as that of the first adjustable joint 148 or may be differently configured. The other components attached to the second adjustable joint 150 such as the second arm 154, locking member 130, telescoping arm 128, and adjustable joint 10 may be the same as those previously discussed or may be different in other exemplary embodiments.

The dual mic frame 144 may include three adjustable joints thereon. One of the adjustable joints 134 may only be capable of pivoting about a single axis 136, while the other two adjustable joints 148 and 150 may be capable of pivoting about more than one axis and may or may not be capable of being positioned perpendicular to the single axis 136.

Figure 26:
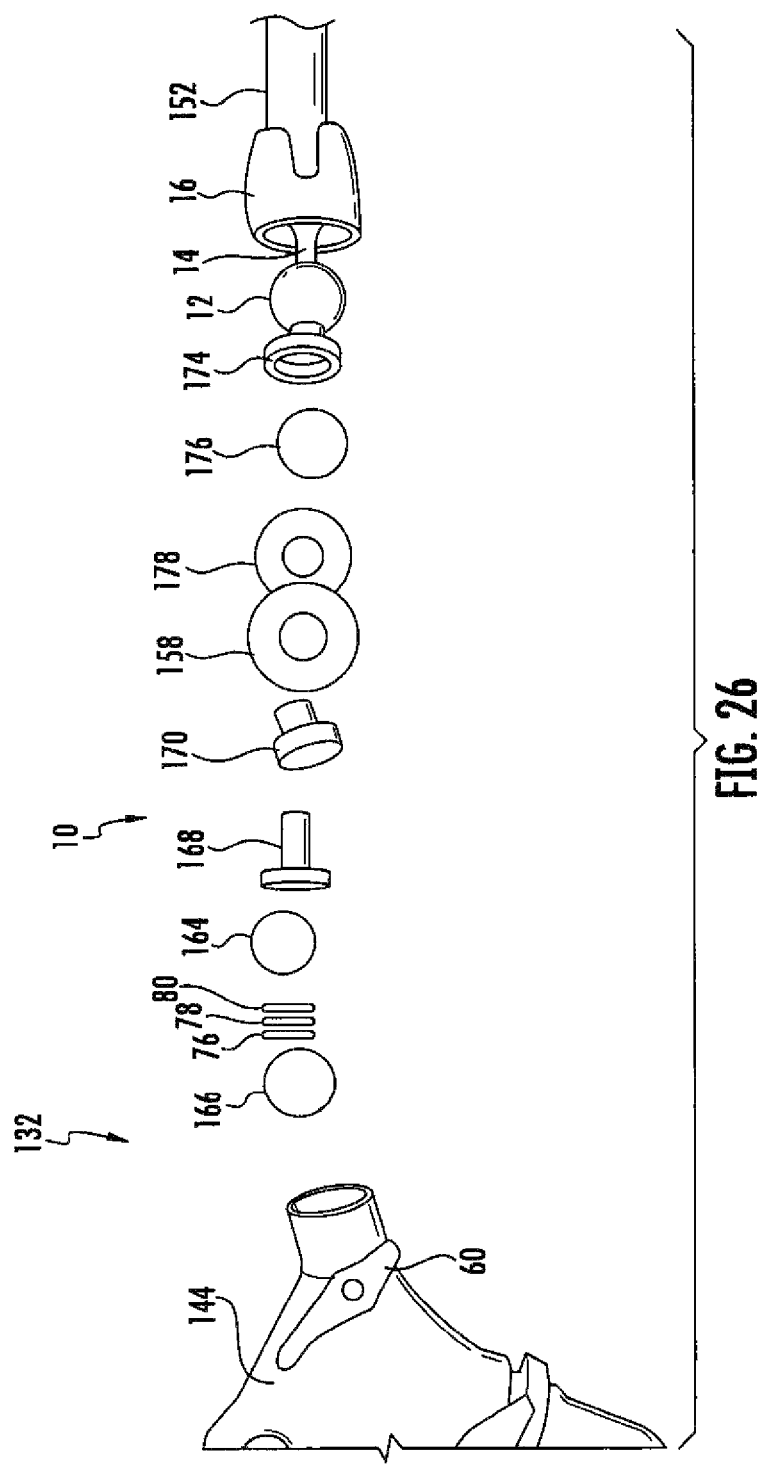
FIG. 26 is an exploded perspective view of an adjustable joint and dual mic frame in accordance with another exemplary embodiment.

FIG. 26 discloses another exemplary embodiment of the adjustable joint 10 that can be used in any of the embodiments disclosed herein. The adjustable joint 10 is used in conjunction with a dual mic frame 144 that may be similar to those as previously discussed. The adjustable joint 10 can be attached to a threaded end of the dual mic frame 144 and may include a lower section, 166, upper section 164, first rod 76, second rod 78, and third rod 80 that can be the same as disclosed herein. A movable plunger 168 may be provided along with an insert piece 170 that may be the same as those disclosed herein or different than those disclosed herein. A control knob 158, attachment component 178, plate 176, and ring cup 174 may be included and may be arranged and function as those disclosed herein or may be arranged and function differently than as discussed herein. The ball 12, stem 14, ball housing 16 and first arm 152 may likewise be included and can be the same as other exemplary embodiments discussed herein.

Figure 27:
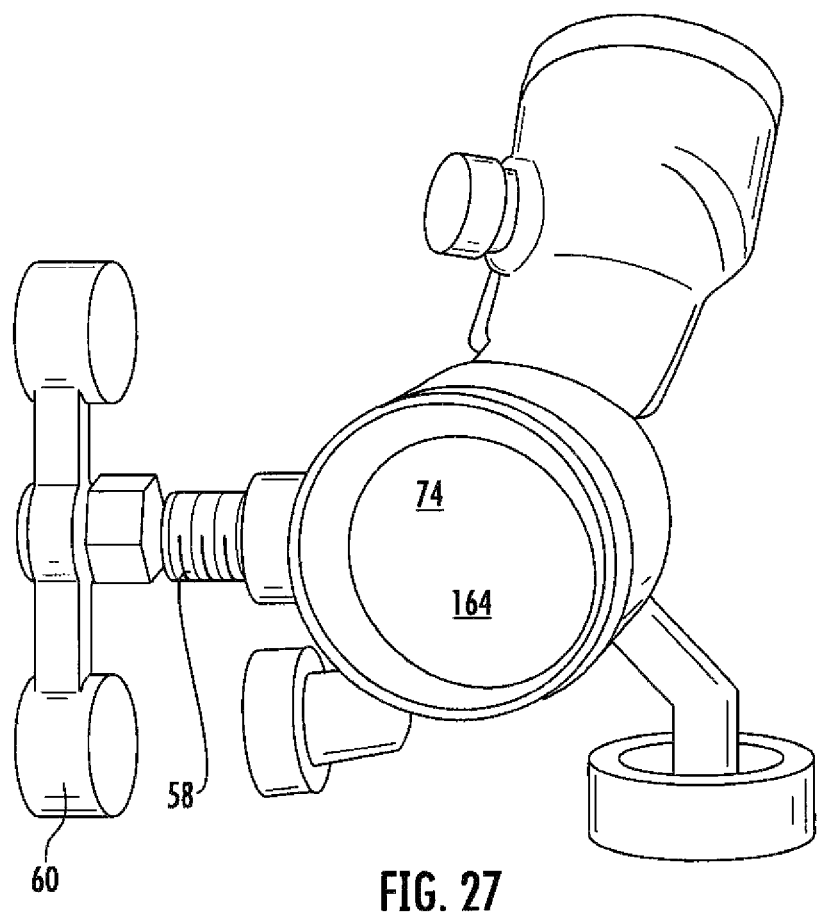
FIG. 27 is a perspective view of a housing located within a dual mic frame.
Figure 28:
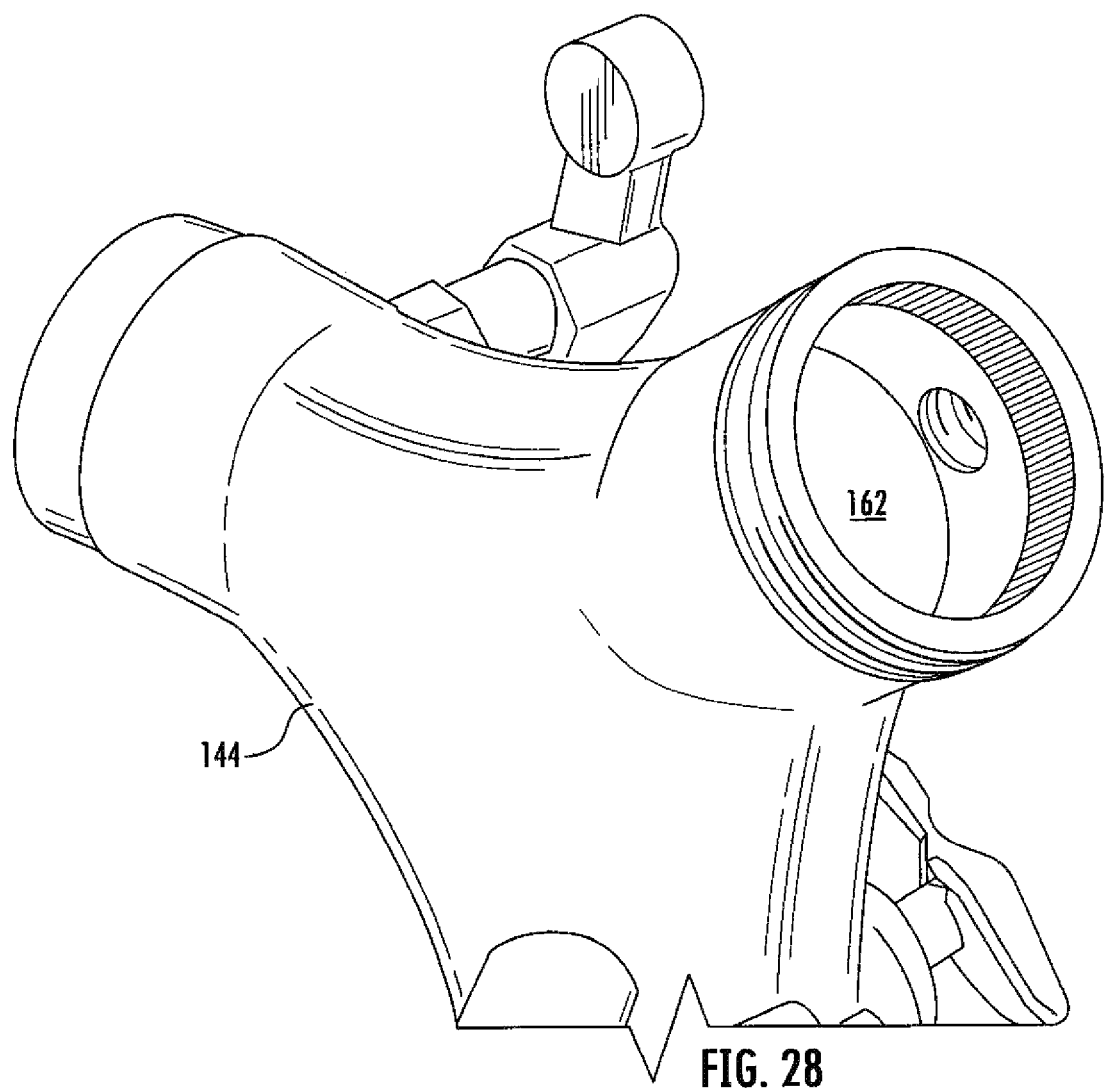
FIG. 28 is a perspective view of a dual mic frame.

Various components of the dual mic frame 144 and the adjustable joint 10 are disclosed with reference to FIGS. 27-32. In FIG. 27, an end of the dual mic frame 144 is shown with the housing 74 shown located within the dual mic frame 144. The upper section 164 of the housing 74 is visible and may be located completely within the dual mic frame 144. The housing 74 is shown removed from the dual mic frame 144 in FIG. 28 such that the plate 162 is visible. The plate 162 is located rearward of the opening through which the aperture that allows the tightening screw 58 to enter is located. External threading on the end of the dual mic frame 144 is shown that receives the control knob 158, ball housing 16, or other threaded member of the adjustable joint 10.

Figures 29A, 29B:
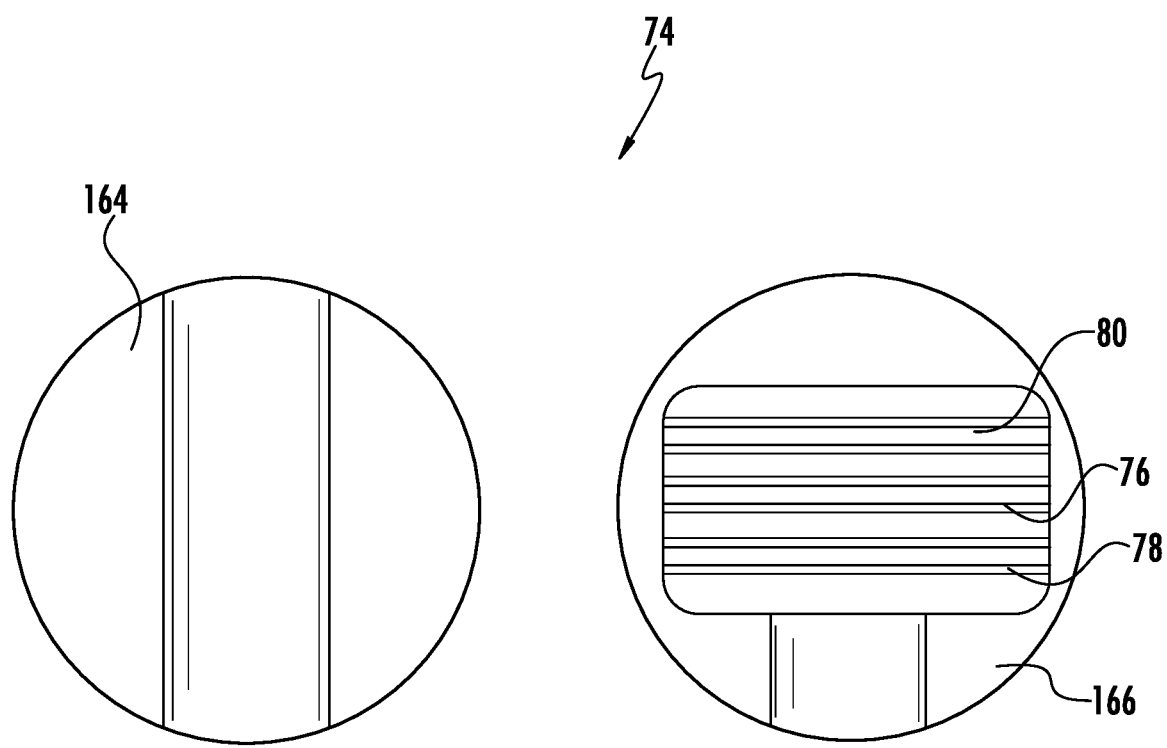
FIGS. 29A and 29B are respective views of a lower section and a bottom view of an upper section of a housing.
Figure 30:
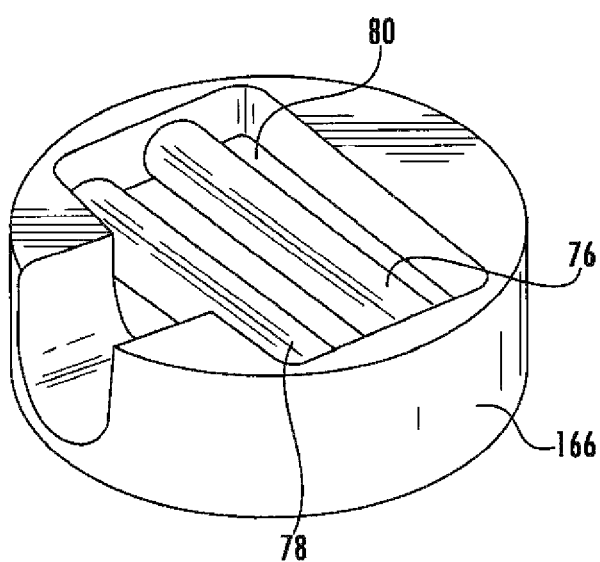
FIG. 30 is a perspective view of the lower section of FIG. 29.

One embodiment of the housing 74 is shown in FIGS. 29A and B. The lower section 166 of the housing 74 is shown as having a receiving groove for the tightening screw 58 (FIG. 29B). An additional cavity is included in the lower section 166 that receives the three rods 76, 78 and 80 that are stacked onto one another in a triangular type arrangement in which the second rod 78 is located closest to the receiving groove for the tightening screw 58. Again, the second rod 78 may be larger than rods 76 and 80 in diameter or may have the same diameter as the rods 76 and 80. The upper section 164 (FIG. 29B) has a groove that accommodates upward movement of the first rod 76, and possibly the second and third rods 78 and 80 when the adjustable joint 10 is placed into the locking position. FIG. 30 shows a perspective view of the lower section 166 and the rods 76, 78 and 80. A portion of the first rod 76 is shown as extending upwards and being located above the upper end of the lower section 166, while the other rods 78 and 80 are all located below the upper end of the lower section 166.

Figure 31:
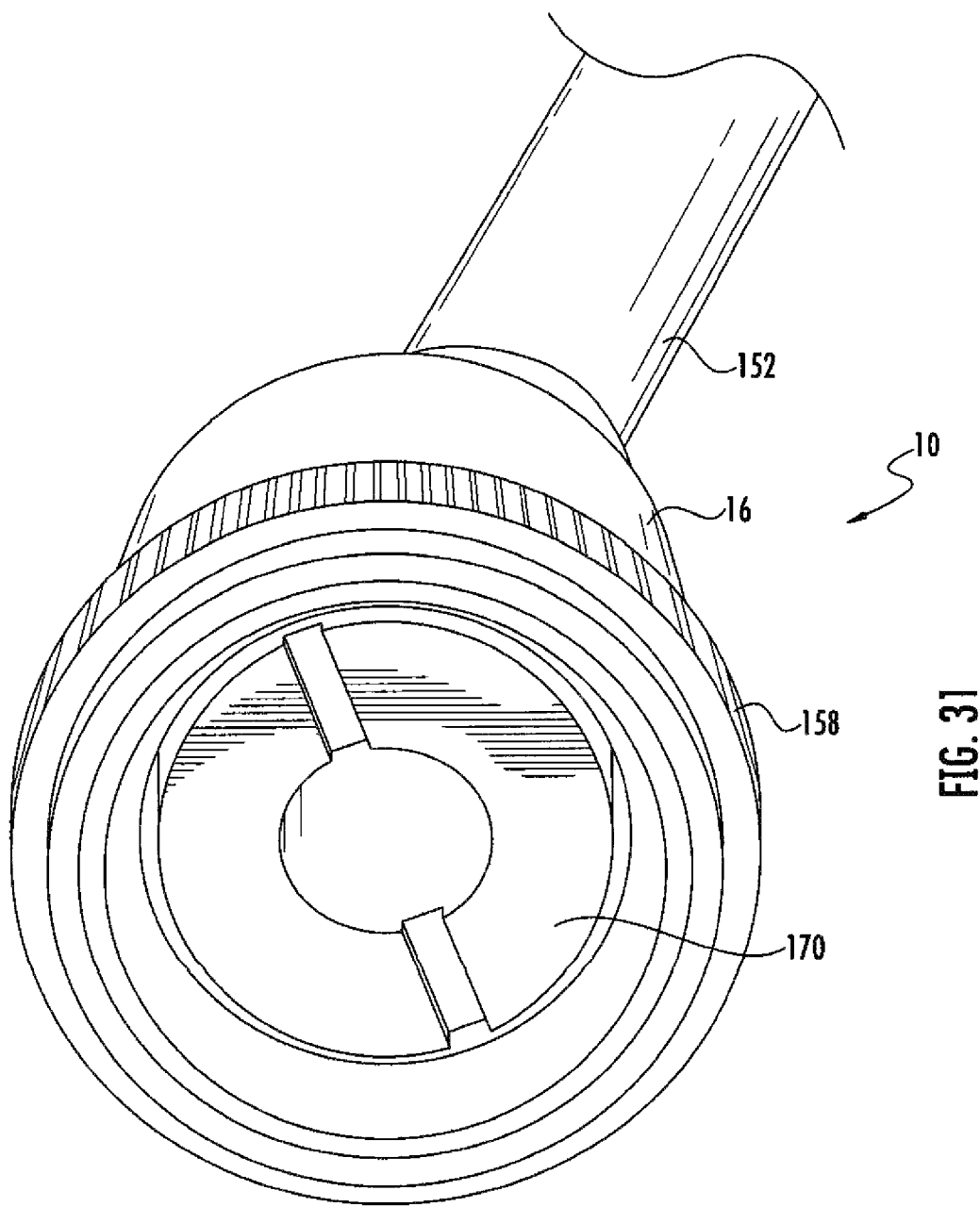
FIG. 31 is a perspective view of an adjustable joint with an insert piece in accordance with one exemplary embodiment.
Figure 32A:
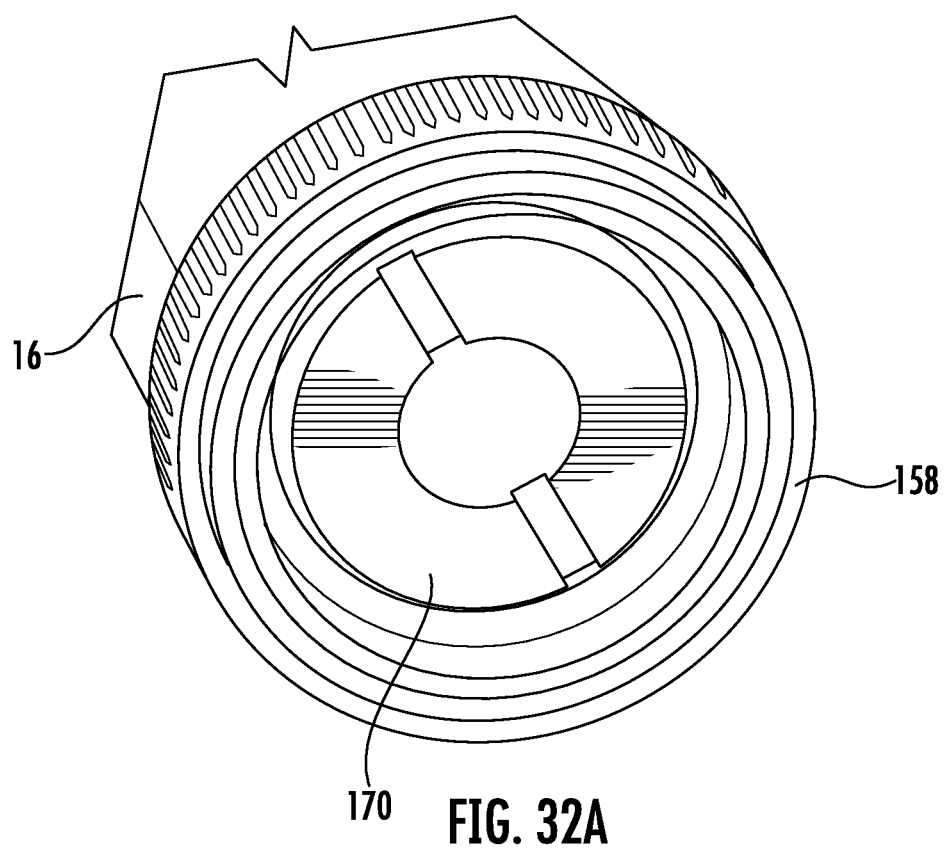
FIG. 32A is a perspective view of an adjustable joint.
Figure 32B:
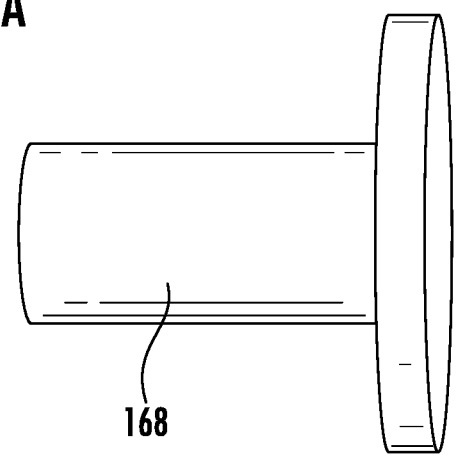
FIG. 32B is a perspective view of a moveable plunger.

A perspective view of portions of the adjustable joint 10 is shown in FIG. 31 in which the insert piece 170 is shown located within the ball housing 16 and the control knob 158. The control knob 158 may have internal threading that allows it to be attached to complimentary external threading of the dual mic frame 144. Another view of the adjustable joint 10 is illustrated in FIG. 32 along with the movable plunger 168 as seen in FIG. 32B. Other components of the adjustable joint 10 may be viewed in FIGS. 32A and 32B that may be connected to the control knob 158.

Figure 33:
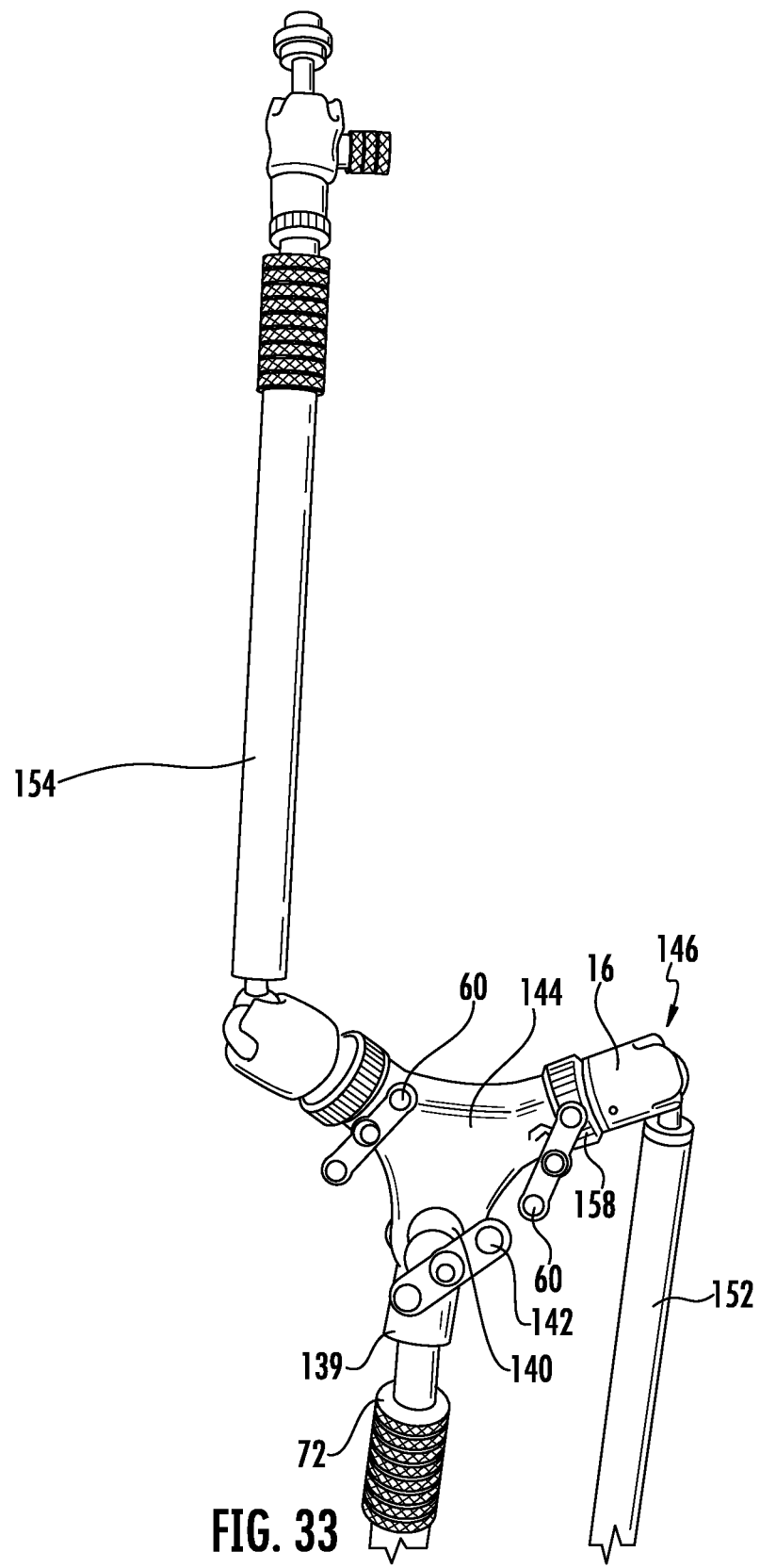
FIG. 33 is a side view of a microphone stand that has a dual mic frame in accordance with one exemplary embodiment.

Another arrangement of the microphone stand 132 is shown with reference to FIG. 33. A dual mic frame 144 is included and may rest on the column 72 and can be adjusted via the pivoting joint 134. A pair of adjustable joints 148 and 150 are attached to the dual mic frame 144 and can carry their own microphone 66 (not shown) so that a pair of microphones 66 can be appropriately positioned and used by different musicians if desired. The first arm 152 is located downward towards the floor, and the second arm 154 is adjusted so as to extend generally in the vertical direction upwards. An adjustable joint 10 is located at the end of the telescoping arm 128 and can be removed if desired. The various components of the microphone stand 132 can be configured as disclosed herein and a repeat of this information is not necessary.

Figure 34:
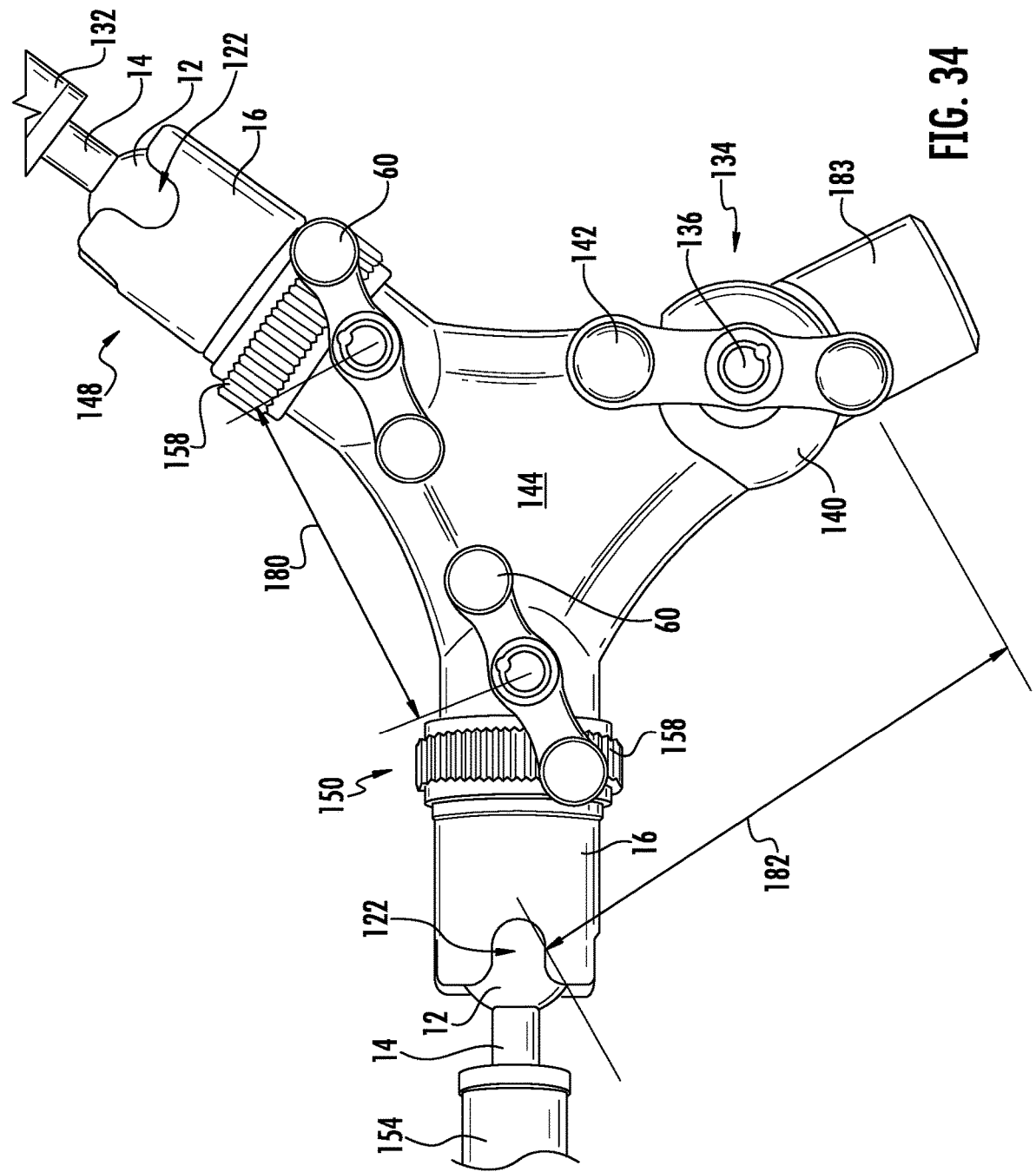
FIG. 34 is a side view of a microphone stand that has a dual mic frame in accordance with one exemplary embodiment.

The microphone stand 132 is also shown in FIG. 34 and may include components as disclosed herein. A distance 180 from the rotation point of knob 60 of the first adjustable joint 148 to the knob 60 of the second adjustable joint 150 may be 73 millimeters in one embodiment, but may be from 50-100 millimeters in accordance with other exemplary embodiments. A distance 182 from the center of the ball 12 of the second adjustable joint 150 to the bottom portion of the second section 140 of the pivoting joint 134 may be 104 millimeters in one embodiment, but may be from 90-150 millimeters or up to 200 millimeters in accordance with other exemplary embodiments. The control knob 158 of either or both of the adjustable joints 148, 150 may have an outer diameter from 39 millimeters to 44 millimeters. The control knobs 158 may have knurling on its outer diameter that is 10 millimeters in length. The length may be in the axial direction 126. The control knobs 158 may have an overall length that can be 15 millimeters in the axial direction 126.

Figure 35:
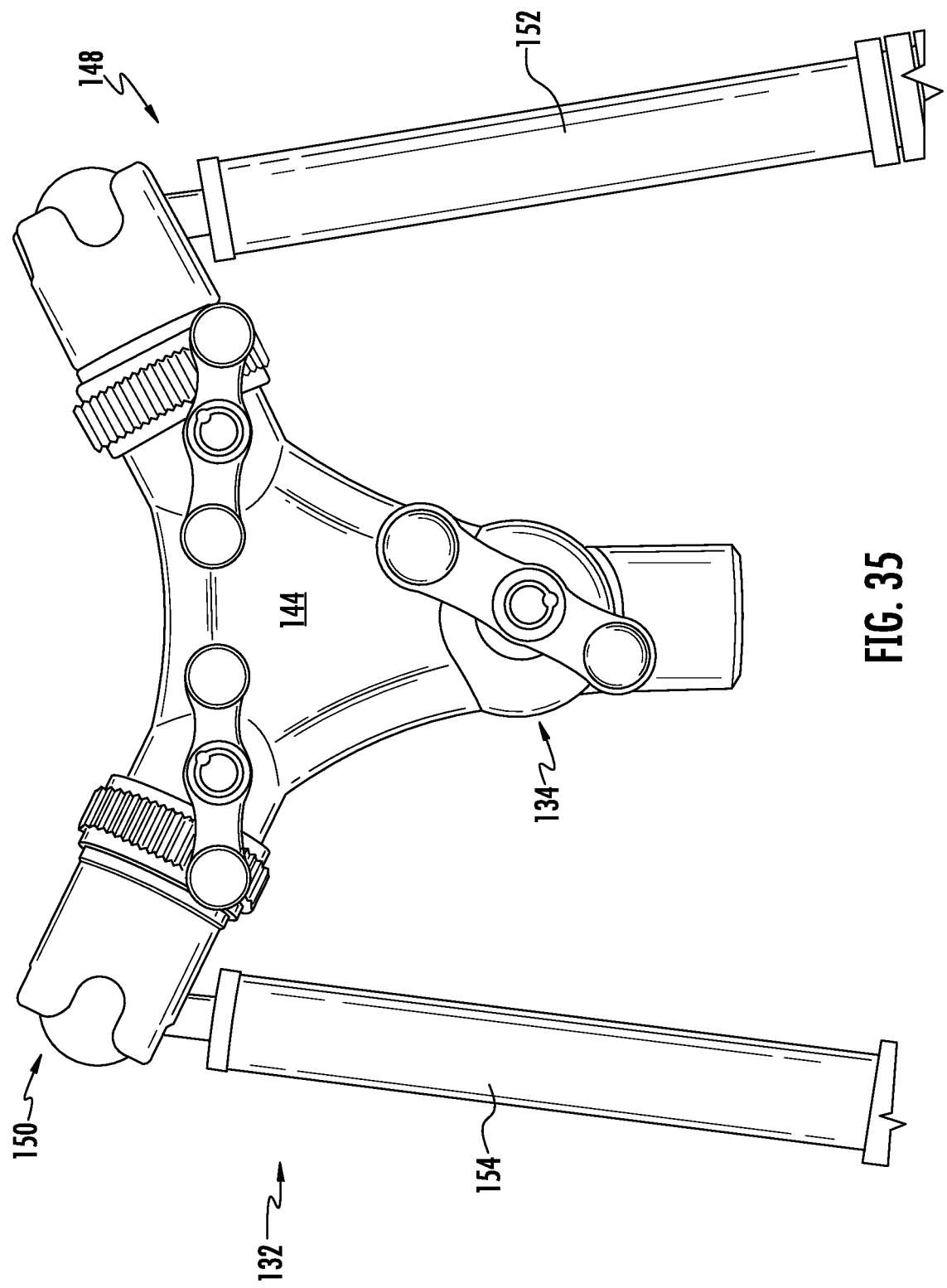
FIG. 35 is a side view of a microphone stand that has a dual mic frame in accordance with another exemplary embodiment.
Figure 36:
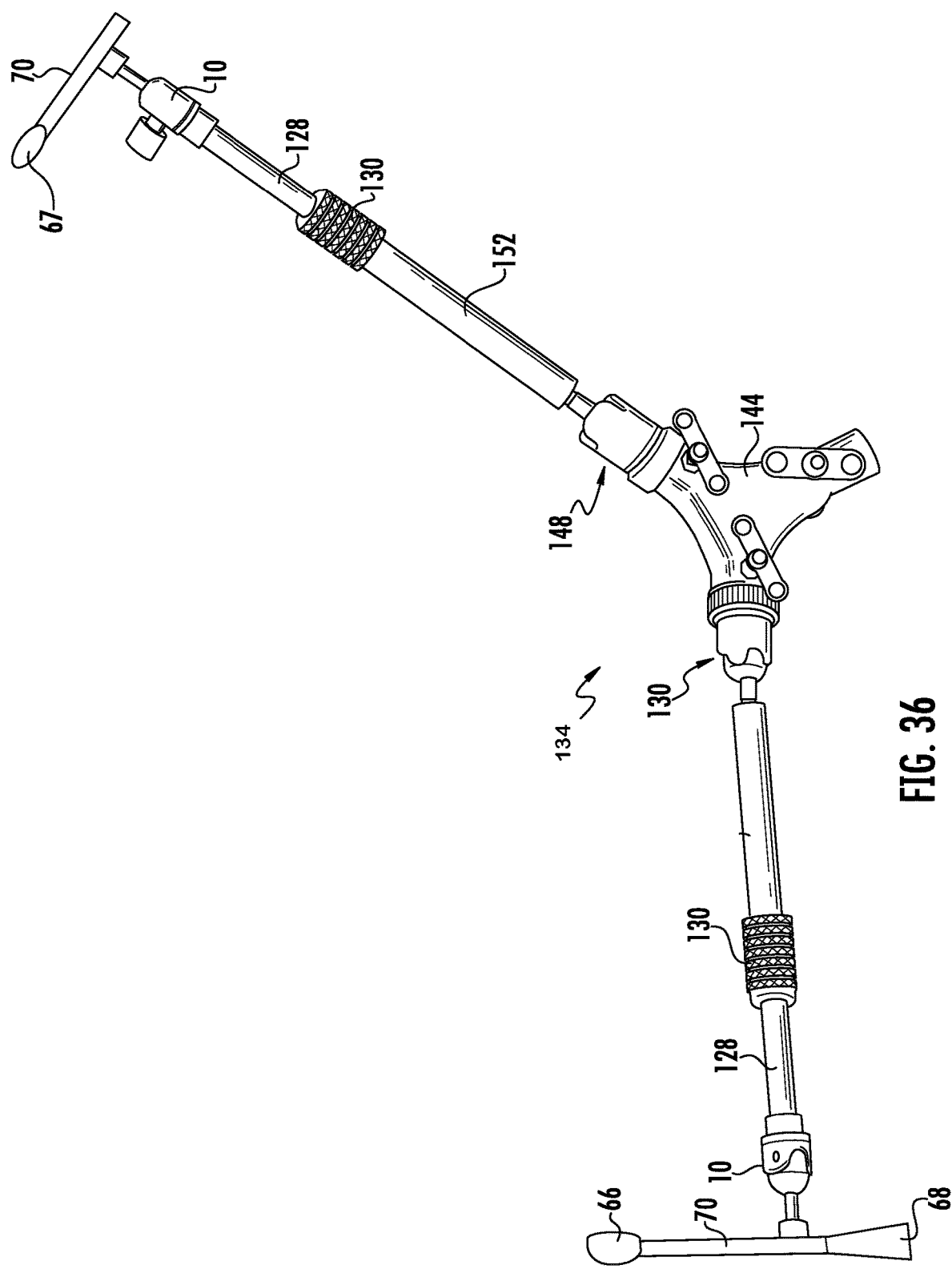
FIG. 36 is a side view of the microphone stand of FIG. 35 adjusted to another position.

FIGS. 35 and 35 show adjustment of the first and second adjustable joints 148 and 150 into different positions relative to one another. In FIG. 35, the adjustable joints 148 and 150 are adjusted so that the arms 154 and 152 are close to being perpendicular with one another but are not completely perpendicular with one another. However, in other embodiments, the arms 154 and 152 can in fact be arranged so as to be perpendicular with one another. In FIG. 36, a first microphone 67 may be attached at the adjustable joint 10 that is carried by the portions if the microphone stand 132 adjustable by the first adjustable joint 148. A second microphone 66 can be carried by the portions of the microphone stand 132 adjustable by the second adjustable joint 150. Although not shown, a column 72 with a base can be attached to the dual mic frame 144 to support this component as well.

Figure 37:
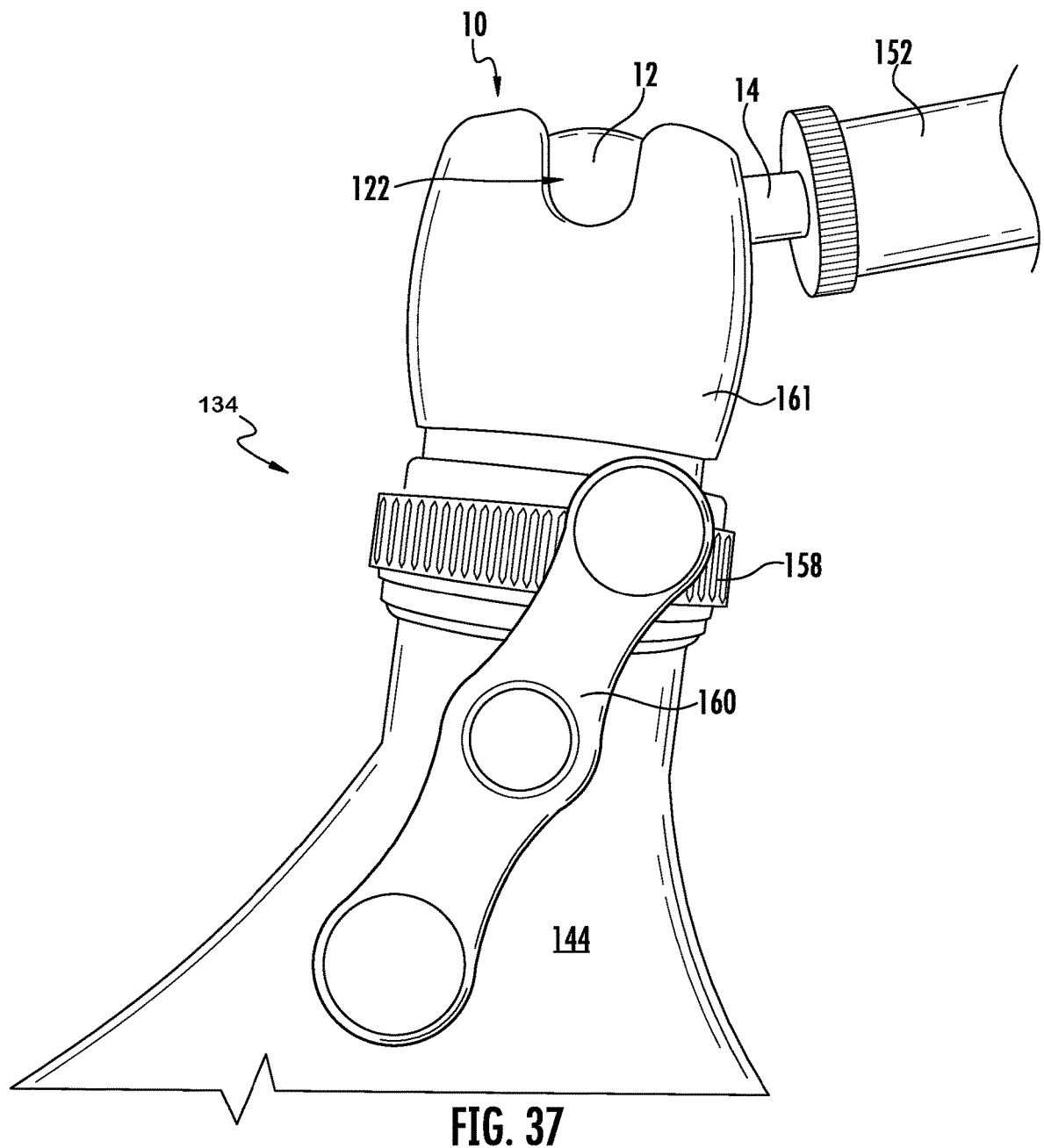
FIG. 37 is a side view of an adjustable joint of a microphone stand in accordance with another exemplary embodiment.

FIG. 37 shows details of the microphone stand 132 from a side view. The various elements or the microphone stand 132 can be arranged as those described herein.

Additional details of various embodiments of the present invention may be found in reference to Applicant's co-pending US Design Application filed on Sep. 26, 2012, having 29/421,803 and US Express Mail Number EM 545861043 US, and which is incorporated herein by reference.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A dual microphone frame comprising:
a substantially planar central body portion having a pivoting joint connector coupled thereto and pivotably mounted upon a column of a microphone stand, and two adjustable joints coupled thereto for use with respective microphones, each of the two adjustable joints comprising:
a ball;
a stem that extends from the ball for supporting a microphone component; and
a ball housing into which the ball is located, the ball housing comprising an annular sidewall having a longitudinal axis and opposing first and second axial ends, wherein the first axial end is open for pivotably receiving the ball therein and coupled to the central body portion, and the second axial end is enclosed and comprises a slot through which the stem extends, the slot having a length that extends along a portion of a front side of the sidewall of the ball housing disposed on a first side of the longitudinal axis, across the second axial end of the ball housing and along a portion of a back side of the sidewall of the ball housing disposed on a second side of the longitudinal axis, wherein opposing first and second ends of the slot are wider at the front side and the back side of the ball housing than a central portion of the slot at the second axial end of the ball housing, wherein the stem is capable of engaging a peripheral edge of the slot so as to limit movement of the ball and the stem with respect to the ball housing, wherein the peripheral edge of the slot from the front side of the ball housing to the back side of the ball housing is continuous so as to be continuous along an entire length of the slot across the enclosed second axial end of the ball housing;

wherein a portion of the peripheral edge of the slot at the front side of the ball housing is closer to the back side of the ball housing than a portion of the peripheral edge of the slot at the second axial end of the ball housing;

wherein the pivoting joint connector defines a longitudinal axis, the longitudinal axes of the pivoting joint connector and two adjustable joints being coplanar within the plane of the central body portion, and wherein the longitudinal axes of the two adjustable joints are positioned on opposing sides of the longitudinal axis defined by the pivoting joint connector; and wherein the pivoting joint connector allows the dual microphone frame to pivot with respect to the column about a central axis of the microphone frame so that any microphone component supported by the two adjustable joints of the dual microphone frame will also be pivoted about the axis.

2. The dual microphone frame according to claim 1, each adjustable joint further comprising:
a cup member that engages the ball;
a plunger;
a first rod that has a curved outer surface, wherein the first rod has a longitudinal axis about which the first rod extends;
a second rod that has a curved outer surface that engages the curved outer surface of the first rod; and
a third rod that has a curved outer surface that engages the curved outer surface of the first rod and wherein the first rod has a diameter greater than either of the second rod or the third rod;
wherein the plunger is capable of engaging the second rod so as to impart force onto the second rod that is subsequently transferred to the first rod so as to move the first rod in a direction perpendicular to the longitudinal axis of the first rod, wherein movement of the first rod causes the first rod to be urged against the cup member which in turn causes the cup member to be urged against the ball which in turn causes the ball to be urged against the ball housing so as to limit movement of the ball and the stem with respect to the ball housing.

3. A dual microphone frame comprising:
a substantially planar central body portion having a pivoting joint connector coupled thereto and pivotably mounted upon a column of a microphone stand, and two adjustable joints coupled thereto for use with respective microphones, each of the joints comprising:
a ball;
a stem that extends from the ball for supporting a microphone component; and
a ball housing into which the ball is located, the ball housing comprising an annular sidewall having a longitudinal axis and opposing first and second axial ends, wherein the first axial end is open for pivotably receiving the ball therein and coupled to the central body portion, and the second axial end is enclosed and comprises a slot through which the stem extends, the slot having a length that extends along a portion of a front side of the sidewall of the ball housing disposed on a first side of the longitudinal axis, across the second axial end of the ball housing and along a portion of a back side of the sidewall of the ball housing disposed on a second side of the longitudinal axis, wherein opposing first and second ends of the slot are wider at the front side and the back side of the ball housing than a central portion of the slot at the second axial end of the ball housing, wherein the stem is capable of engaging a peripheral edge of the slot so as to limit movement of the ball and the stem with respect to the ball housing, wherein the peripheral edge of the slot from the front side of the ball housing to the back side of the ball housing is continuous so as to be continuous along an entire length of the slot across the enclosed second axial end of the ball housing;

wherein a portion of the peripheral edge of the slot at the front side of the ball housing is closer to the back side of the ball housing than a portion of the peripheral edge of the slot at the second axial end of the ball housing;

wherein the pivoting joint connector defines a longitudinal axis, the longitudinal axes of the pivoting joint connector and two adjustable joints being coplanar within the plane of the central body portion, and wherein the longitudinal axes of the two adjustable joints are positioned on opposing sides of the longitudinal axis defined by the pivoting joint connector; and wherein the pivoting joint connector receives therein a terminal end of the microphone stand and allows the dual microphone frame to pivot with respect to the column about a central axis of the microphone frame so that any microphone components supported by the dual microphone frame will also be pivoted about the axis, each of the two adjustable joints being supported above the terminal end of the column when the frame is secured to the column.

4. The dual microphone frame according to claim 3, each adjustable joint further comprising:
a cup member that engages the ball;
a plunger;
a first rod that has a curved outer surface, wherein the first rod has a longitudinal axis about which the first rod extends;
a second rod that has a curved outer surface that engages the curved outer surface of the first rod; and
a third rod that has a curved outer surface that engages the curved outer surface of the first rod and wherein the first rod has a diameter greater than either of the second rod or the third rod;
wherein the plunger is capable of engaging the second rod so as to impart force onto the second rod that is subsequently transferred to the first rod so as to move the first rod in a direction perpendicular to the longitudinal axis of the first rod, wherein movement of the first rod causes the first rod to be urged against the cup member which in turn causes the cup member to be urged against the ball which in turn causes the ball to be urged against the ball housing so as to limit movement of the ball and the stem with respect to the ball housing.

* * * * *